US012054028B1

(12) United States Patent
Carter et al.

(10) Patent No.: US 12,054,028 B1
(45) Date of Patent: Aug. 6, 2024

(54) MOTION CONTROL SYSTEMS

(71) Applicants: Troy A. Carter, Sunnyvale, CA (US); James J. Dowle, Laguna Beach, CA (US); Jonathan L. Hall, Menlo Park, CA (US)

(72) Inventors: Troy A. Carter, Sunnyvale, CA (US); James J. Dowle, Laguna Beach, CA (US); Jonathan L. Hall, Menlo Park, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/746,532

(22) Filed: May 17, 2022

Related U.S. Application Data

(63) Continuation of application No. 16/850,369, filed on Apr. 16, 2020, now Pat. No. 11,345,209.

(60) Provisional application No. 62/939,714, filed on Nov. 25, 2019, provisional application No. 62/856,294, filed on Jun. 3, 2019.

(51) Int. Cl.
B60G 21/055 (2006.01)
B60G 17/016 (2006.01)
B60G 17/06 (2006.01)

(52) U.S. Cl.
CPC ....... *B60G 21/0553* (2013.01); *B60G 17/016* (2013.01); *B60G 17/06* (2013.01)

(58) Field of Classification Search
CPC .... B60G 21/055; B60G 17/016; B60G 17/06; B60G 2200/18; B60G 21/0553; B60G 21/0555; B60G 21/0556; B60G 21/073
See application file for complete search history.

(56) References Cited

U.S. PATENT DOCUMENTS

| | | | |
|---|---|---|---|
| 2,757,938 A | 8/1956 | Crowder | |
| 2,901,239 A | 8/1959 | Sethna | |
| 2,913,252 A | 11/1959 | Norrie | |
| 3,089,710 A | 5/1963 | Fiala | |
| 3,236,334 A | 2/1966 | Wallerstein, Jr. | |
| 3,292,945 A * | 12/1966 | Dangauthier | B60G 3/20 280/124.152 |
| 3,322,379 A | 5/1967 | Flannelly | |

(Continued)

FOREIGN PATENT DOCUMENTS

CN 101065259 A 10/2007
CN 108215946 A 6/2018
(Continued)

OTHER PUBLICATIONS

Monroe Intelligent Suspension, "CVSA2/Kinetic: Low Energy for High Performance", www.monroeintelligentsuspension.com/products/cvsa2-kinetic/, Date Unknown, Downloaded Mar. 2, 2017, 2 pp.

(Continued)

*Primary Examiner* — Amy R Weisberg
*Assistant Examiner* — Matthew Joseph Ganci
(74) *Attorney, Agent, or Firm* — Young Basile Hanlon & MacFarlane, P.C.

(57) ABSTRACT

A system that a crossbar that is pivotally connected to a first structure and is pivotally connected to a second structure. The system also includes a first actuator that is located near the first structure and is connected to the crossbar. The system also includes a second actuator that is located near the second structure and is connected to the crossbar.

22 Claims, 23 Drawing Sheets

(56) References Cited

U.S. PATENT DOCUMENTS

| | | | |
|---|---|---|---|
| 3,368,824 A | 2/1968 | Julien | |
| 3,441,238 A | 4/1969 | Flannelly | |
| 3,741,581 A | 6/1973 | Patrin | |
| 3,781,032 A | 12/1973 | Jones | |
| 3,820,812 A * | 6/1974 | Stubbs | B60G 21/106 |
| | | | 280/5.506 |
| 3,970,162 A | 7/1976 | Le Salver et al. | |
| 4,206,935 A * | 6/1980 | Sheppard | B60G 21/0556 |
| | | | 280/124.102 |
| 4,379,572 A | 4/1983 | Hedenberg | |
| 4,530,514 A | 7/1985 | To | |
| 4,537,420 A | 8/1985 | Ito et al. | |
| 4,589,678 A | 5/1986 | Lund | |
| 4,613,152 A | 9/1986 | Booher | |
| 4,614,359 A | 9/1986 | Lundin et al. | |
| 4,634,142 A | 1/1987 | Woods et al. | |
| 4,637,628 A | 1/1987 | Perkins | |
| 4,643,270 A | 2/1987 | Beer | |
| 4,659,106 A * | 4/1987 | Fujita | B62D 9/02 |
| | | | 280/93.514 |
| 4,784,378 A | 11/1988 | Ford | |
| 4,834,416 A | 5/1989 | Shimoe et al. | |
| 4,877,098 A | 10/1989 | Asanuma | |
| 4,893,832 A | 1/1990 | Booher | |
| 4,922,159 A | 5/1990 | Phillips et al. | |
| 4,960,290 A | 10/1990 | Bose | |
| 4,981,309 A | 1/1991 | Froeschle et al. | |
| 4,991,698 A | 2/1991 | Hanson | |
| 5,027,048 A | 6/1991 | Masrur et al. | |
| 5,033,028 A | 7/1991 | Browning | |
| 5,060,959 A | 10/1991 | Davis et al. | |
| 5,172,930 A | 12/1992 | Boye et al. | |
| 5,244,053 A | 9/1993 | Kashiwagi | |
| 5,251,926 A | 10/1993 | Aulerich et al. | |
| 5,364,081 A | 11/1994 | Hartl | |
| 5,401,053 A | 3/1995 | Sahm et al. | |
| 5,409,254 A | 4/1995 | Minor et al. | |
| 5,468,055 A | 11/1995 | Simon et al. | |
| 5,507,518 A | 4/1996 | Nakahara et al. | |
| 5,517,414 A | 5/1996 | Hrovat | |
| 5,588,368 A | 12/1996 | Richter et al. | |
| 5,623,878 A | 4/1997 | Baxter et al. | |
| 5,645,250 A | 7/1997 | Gevers | |
| 5,678,847 A | 10/1997 | Izawa et al. | |
| 5,765,859 A | 6/1998 | Nowell et al. | |
| 5,785,345 A | 7/1998 | Barlas et al. | |
| 5,810,335 A | 9/1998 | Wirtz et al. | |
| 5,829,764 A | 11/1998 | Griffiths | |
| 5,880,542 A | 3/1999 | Leary et al. | |
| 6,032,770 A | 3/2000 | Alcone et al. | |
| 6,113,119 A | 9/2000 | Laurent et al. | |
| 6,142,494 A | 11/2000 | Higuchi | |
| 6,170,838 B1 | 1/2001 | Laurent et al. | |
| 6,233,510 B1 | 5/2001 | Platner et al. | |
| 6,249,728 B1 | 6/2001 | Streiter | |
| 6,276,710 B1 | 8/2001 | Sutton | |
| 6,314,353 B1 | 11/2001 | Ohsaku et al. | |
| 6,357,770 B1 | 3/2002 | Carpiaux et al. | |
| 6,364,078 B1 | 4/2002 | Parison et al. | |
| 6,443,436 B1 | 9/2002 | Schel | |
| 6,470,248 B2 | 10/2002 | Shank et al. | |
| 6,502,837 B1 | 1/2003 | Hamilton et al. | |
| 6,513,819 B1 | 2/2003 | Oliver et al. | |
| 6,634,445 B2 | 10/2003 | Dix et al. | |
| 6,637,561 B1 | 10/2003 | Collins et al. | |
| 6,722,676 B2 * | 4/2004 | Zadok | B60G 3/20 |
| | | | 280/5.502 |
| 6,873,891 B2 | 3/2005 | Moser et al. | |
| 6,926,288 B2 | 8/2005 | Bender | |
| 6,940,248 B2 | 9/2005 | Maresca et al. | |
| 6,945,541 B2 | 9/2005 | Brown | |
| 7,017,690 B2 | 3/2006 | Burke | |
| 7,032,723 B2 | 4/2006 | Quaglia et al. | |
| 7,051,851 B2 | 5/2006 | Svartz et al. | |
| 7,135,794 B2 | 11/2006 | Kuhnel | |
| 7,140,601 B2 | 11/2006 | Nesbitt et al. | |
| 7,195,250 B2 | 3/2007 | Knox et al. | |
| 7,202,577 B2 | 4/2007 | Parison et al. | |
| 7,302,825 B2 | 12/2007 | Knox | |
| 7,308,351 B2 | 12/2007 | Knoop et al. | |
| 7,392,997 B2 | 7/2008 | Sanville et al. | |
| 7,401,794 B2 | 7/2008 | Laurent et al. | |
| 7,421,954 B2 | 9/2008 | Bose | |
| 7,427,072 B2 | 9/2008 | Brown | |
| 7,484,744 B2 | 2/2009 | Galazin et al. | |
| 7,502,589 B2 | 3/2009 | Howard et al. | |
| 7,543,825 B2 | 6/2009 | Yamada | |
| 7,551,749 B2 | 6/2009 | Rosen et al. | |
| 7,641,010 B2 | 1/2010 | Mizutani et al. | |
| 7,644,938 B2 | 1/2010 | Yamada | |
| 7,654,540 B2 | 2/2010 | Parison et al. | |
| 7,818,109 B2 | 10/2010 | Scully | |
| 7,823,891 B2 | 11/2010 | Bushko et al. | |
| 7,932,684 B2 | 4/2011 | O'Day et al. | |
| 7,962,261 B2 * | 6/2011 | Bushko | B60G 21/0555 |
| | | | 701/37 |
| 7,963,529 B2 | 6/2011 | Oteman et al. | |
| 7,976,038 B2 | 7/2011 | Gregg | |
| 8,047,551 B2 | 11/2011 | Morris et al. | |
| 8,067,863 B2 | 11/2011 | Giovanardi | |
| 8,095,268 B2 | 1/2012 | Parison et al. | |
| 8,099,213 B2 | 1/2012 | Zhang et al. | |
| 8,109,371 B2 | 2/2012 | Kondo et al. | |
| 8,112,198 B2 | 2/2012 | Parison, Jr. et al. | |
| 8,113,522 B2 | 2/2012 | Oteman et al. | |
| 8,127,900 B2 | 3/2012 | Inoue | |
| 8,157,036 B2 | 4/2012 | Yogo et al. | |
| 8,191,874 B2 | 6/2012 | Inoue et al. | |
| 8,282,149 B2 | 10/2012 | Kniffin et al. | |
| 8,336,319 B2 | 12/2012 | Johnston et al. | |
| 8,356,861 B2 | 1/2013 | Kniffin et al. | |
| 8,360,387 B2 | 1/2013 | Breen et al. | |
| 8,370,022 B2 | 2/2013 | Inoue et al. | |
| 8,387,762 B2 | 3/2013 | Kondo et al. | |
| 8,398,091 B2 | 3/2013 | Inoue et al. | |
| 8,417,417 B2 | 4/2013 | Chen et al. | |
| 8,428,305 B2 | 4/2013 | Zhang et al. | |
| 8,466,639 B2 | 6/2013 | Parison, Jr. et al. | |
| 8,469,164 B2 | 6/2013 | Kondo et al. | |
| 8,490,761 B2 | 7/2013 | Kondo | |
| 8,499,903 B2 | 8/2013 | Sakuta et al. | |
| 8,525,453 B2 | 9/2013 | Ogawa | |
| 8,544,620 B2 | 10/2013 | Inoue et al. | |
| 8,548,678 B2 | 10/2013 | Ummethala et al. | |
| 8,579,311 B2 | 11/2013 | Butlin, Jr. et al. | |
| 8,598,831 B2 | 12/2013 | Ogawa et al. | |
| 8,632,078 B2 | 1/2014 | Ehrlich et al. | |
| 8,641,052 B2 | 2/2014 | Kondo et al. | |
| 8,641,053 B2 | 2/2014 | Pare et al. | |
| 8,668,060 B2 | 3/2014 | Kondo et al. | |
| 8,682,530 B2 | 3/2014 | Nakamura | |
| 8,701,845 B2 | 4/2014 | Kondo | |
| 8,725,351 B1 | 5/2014 | Selden et al. | |
| 8,744,680 B2 | 6/2014 | Rieger et al. | |
| 8,744,694 B2 | 6/2014 | Ystueta | |
| 8,757,309 B2 | 6/2014 | Schmitt et al. | |
| 8,783,430 B2 | 7/2014 | Brown | |
| 8,793,052 B2 | 7/2014 | Inoue et al. | |
| 8,890,461 B2 | 11/2014 | Knox et al. | |
| 8,930,074 B1 | 1/2015 | Lin | |
| 8,938,333 B2 | 1/2015 | Bose et al. | |
| 9,062,983 B2 | 6/2015 | Zych | |
| 9,079,473 B2 | 7/2015 | Lee et al. | |
| 9,102,209 B2 | 8/2015 | Giovanardi et al. | |
| 9,291,300 B2 | 3/2016 | Parker et al. | |
| 9,316,667 B2 | 4/2016 | Ummethala et al. | |
| 9,349,304 B2 | 5/2016 | Sangermano, II et al. | |
| 9,399,384 B2 | 7/2016 | Lee et al. | |
| 9,428,029 B2 | 8/2016 | Job | |
| 9,533,539 B2 | 1/2017 | Eng et al. | |
| 9,550,495 B2 | 1/2017 | Tatourian et al. | |
| 9,625,902 B2 | 4/2017 | Knox | |
| 9,643,467 B2 | 5/2017 | Selden et al. | |
| 9,702,349 B2 | 7/2017 | Anderson et al. | |

(56) References Cited

U.S. PATENT DOCUMENTS

| | | |
|---|---|---|
| 9,855,887 B1 | 1/2018 | Potter et al. |
| 9,868,332 B2 | 1/2018 | Anderson et al. |
| 9,975,391 B2 | 5/2018 | Tseng et al. |
| 10,065,474 B2 | 9/2018 | Trangbaek |
| 10,081,408 B2 | 9/2018 | Yoshida |
| 10,093,145 B1 | 10/2018 | Vaughan et al. |
| 10,245,984 B2 | 4/2019 | Parker et al. |
| 10,300,760 B1 | 5/2019 | Aikin et al. |
| 10,315,481 B2 | 6/2019 | Lu et al. |
| 10,377,371 B2 | 8/2019 | Anderson et al. |
| 10,407,035 B1 | 9/2019 | Gadda et al. |
| 10,513,161 B2 | 12/2019 | Anderson et al. |
| 10,906,370 B1 | 2/2021 | Hall et al. |
| 11,124,035 B1 | 9/2021 | Hall et al. |
| 11,173,766 B1 | 11/2021 | Hall et al. |
| 11,345,209 B1 | 5/2022 | Carter et al. |
| 11,358,431 B2 | 6/2022 | Hall et al. |
| 2001/0045719 A1 | 11/2001 | Smith |
| 2002/0190486 A1 | 12/2002 | Phillis et al. |
| 2003/0030241 A1* | 2/2003 | Lawson ............... B60G 7/001 280/124.142 |
| 2003/0080526 A1 | 5/2003 | Conover |
| 2004/0054455 A1 | 3/2004 | Voight et al. |
| 2004/0074720 A1 | 4/2004 | Thieltges |
| 2004/0094912 A1 | 5/2004 | Niwa et al. |
| 2004/0226788 A1 | 11/2004 | Tanner |
| 2004/0232648 A1 | 11/2004 | Ohki |
| 2004/0245732 A1 | 12/2004 | Kotulla et al. |
| 2005/0051986 A1 | 3/2005 | Galazin et al. |
| 2005/0096171 A1 | 5/2005 | Brown et al. |
| 2005/0199457 A1 | 9/2005 | Beck |
| 2005/0206231 A1 | 9/2005 | Lu et al. |
| 2005/0211516 A1 | 9/2005 | Kondo et al. |
| 2005/0247496 A1 | 11/2005 | Nagaya |
| 2006/0043804 A1 | 3/2006 | Kondou |
| 2006/0076828 A1 | 4/2006 | Lu et al. |
| 2006/0119064 A1 | 6/2006 | Mizuno et al. |
| 2006/0181034 A1 | 8/2006 | Wilde et al. |
| 2006/0266599 A1 | 11/2006 | Denys et al. |
| 2006/0267296 A1 | 11/2006 | Dodd et al. |
| 2006/0273530 A1 | 12/2006 | Zuber |
| 2007/0069496 A1 | 3/2007 | Rinehart et al. |
| 2007/0107959 A1 | 5/2007 | Suzuki et al. |
| 2007/0114706 A1 | 5/2007 | Myers |
| 2007/0199750 A1 | 8/2007 | Suzuki et al. |
| 2007/0210539 A1 | 9/2007 | Hakui et al. |
| 2008/0017462 A1 | 1/2008 | Mizutani et al. |
| 2008/0100020 A1 | 5/2008 | Gashi et al. |
| 2008/0111334 A1 | 5/2008 | Inoue et al. |
| 2008/0164111 A1 | 7/2008 | Inoue et al. |
| 2008/0185807 A1 | 8/2008 | Takenaka |
| 2008/0283315 A1 | 11/2008 | Suzuki et al. |
| 2009/0033055 A1 | 2/2009 | Morris et al. |
| 2009/0064808 A1 | 3/2009 | Parison et al. |
| 2009/0095584 A1 | 4/2009 | Kondo et al. |
| 2009/0108546 A1 | 4/2009 | Ohletz et al. |
| 2009/0120745 A1 | 5/2009 | Kondo et al. |
| 2009/0121398 A1 | 5/2009 | Inoue |
| 2009/0173585 A1 | 7/2009 | Kappagantu |
| 2009/0174158 A1 | 7/2009 | Anderson et al. |
| 2009/0198419 A1 | 8/2009 | Clark |
| 2009/0218867 A1 | 9/2009 | Clark |
| 2009/0223322 A1 | 9/2009 | Kossira et al. |
| 2009/0243402 A1 | 10/2009 | O'Day et al. |
| 2009/0243598 A1 | 10/2009 | O'Day |
| 2009/0273147 A1 | 11/2009 | Inoue et al. |
| 2009/0286910 A1 | 11/2009 | Bloomfield |
| 2009/0302559 A1 | 12/2009 | Doerfel |
| 2009/0321201 A1 | 12/2009 | Sakuta et al. |
| 2010/0044977 A1 | 2/2010 | Hughes et al. |
| 2010/0059944 A1 | 3/2010 | Oteman et al. |
| 2010/0059959 A1 | 3/2010 | Kim |
| 2010/0152969 A1 | 6/2010 | Li et al. |
| 2010/0200343 A1 | 8/2010 | Kondo et al. |
| 2010/0207344 A1 | 8/2010 | Nakamura |
| 2010/0222960 A1 | 9/2010 | Oida et al. |
| 2010/0230876 A1 | 9/2010 | Inoue et al. |
| 2010/0252376 A1 | 10/2010 | Chern et al. |
| 2010/0253019 A1 | 10/2010 | Ogawa |
| 2011/0025000 A1 | 2/2011 | Inoue et al. |
| 2011/0115183 A1 | 5/2011 | Alesso et al. |
| 2011/0277241 A1 | 11/2011 | Schejbal |
| 2011/0298399 A1 | 12/2011 | Ogawa et al. |
| 2012/0013277 A1 | 1/2012 | Ogawa |
| 2012/0059547 A1 | 3/2012 | Chen et al. |
| 2012/0109483 A1 | 5/2012 | O'Dea et al. |
| 2012/0153718 A1 | 6/2012 | Rawlinson et al. |
| 2012/0181757 A1 | 7/2012 | Oteman et al. |
| 2012/0187640 A1 | 7/2012 | Kondo et al. |
| 2012/0193847 A1 | 8/2012 | Muragishi et al. |
| 2012/0305348 A1 | 12/2012 | Katayama et al. |
| 2012/0306170 A1 | 12/2012 | Serbu et al. |
| 2013/0060422 A1 | 3/2013 | Ogawa et al. |
| 2013/0060423 A1 | 3/2013 | Jolly |
| 2013/0106074 A1 | 5/2013 | Koku et al. |
| 2013/0221625 A1 | 8/2013 | Pare et al. |
| 2013/0229074 A1 | 9/2013 | Haferman et al. |
| 2013/0233632 A1 | 9/2013 | Kim et al. |
| 2013/0249464 A1 | 9/2013 | Knox et al. |
| 2013/0253764 A1 | 9/2013 | Kikuchi et al. |
| 2013/0341143 A1 | 12/2013 | Brown |
| 2014/0005888 A1 | 1/2014 | Bose et al. |
| 2014/0145498 A1 | 5/2014 | Yamakado et al. |
| 2014/0156143 A1 | 6/2014 | Evangelou et al. |
| 2014/0260233 A1 | 9/2014 | Giovanardi et al. |
| 2014/0312580 A1 | 10/2014 | Gale |
| 2014/0326430 A1 | 11/2014 | Carpenter et al. |
| 2014/0358378 A1 | 12/2014 | Howard et al. |
| 2015/0102569 A1 | 4/2015 | Slawson |
| 2015/0123370 A1 | 5/2015 | Lee et al. |
| 2015/0197130 A1 | 7/2015 | Smith et al. |
| 2015/0224845 A1 | 8/2015 | Anderson et al. |
| 2015/0231942 A1 | 8/2015 | Trangbaek et al. |
| 2015/0259028 A1 | 9/2015 | Ishikawa et al. |
| 2015/0343876 A1 | 12/2015 | Yoshizawa et al. |
| 2015/0360532 A1 | 12/2015 | Kim |
| 2016/0059658 A1 | 3/2016 | Kuriki |
| 2016/0096458 A1 | 4/2016 | Parker et al. |
| 2016/0129967 A1* | 5/2016 | Sasaki ................... B62K 5/027 280/124.103 |
| 2016/0159187 A1 | 6/2016 | Mohamed |
| 2016/0167743 A1 | 6/2016 | Melcher |
| 2016/0200164 A1 | 7/2016 | Tabata et al. |
| 2016/0291574 A1 | 10/2016 | Parison |
| 2016/0339823 A1 | 11/2016 | Smith et al. |
| 2016/0347143 A1 | 12/2016 | Hrovat et al. |
| 2017/0047823 A1 | 2/2017 | Sangermano, III et al. |
| 2017/0100980 A1 | 4/2017 | Tsuda |
| 2017/0129298 A1 | 5/2017 | Lu et al. |
| 2017/0129367 A1 | 5/2017 | Hein |
| 2017/0129371 A1 | 5/2017 | Knox |
| 2017/0129372 A1 | 5/2017 | Hein et al. |
| 2017/0129373 A1 | 5/2017 | Knox et al. |
| 2017/0137023 A1 | 5/2017 | Anderson et al. |
| 2017/0144501 A1 | 5/2017 | Wall |
| 2017/0203673 A1 | 7/2017 | Parker et al. |
| 2017/0240018 A1 | 8/2017 | Mettrick et al. |
| 2017/0241504 A1 | 8/2017 | Delorenzis et al. |
| 2017/0253101 A1 | 9/2017 | Kuriki |
| 2017/0253155 A1 | 9/2017 | Knox et al. |
| 2018/0015801 A1 | 1/2018 | Mohamed et al. |
| 2018/0022178 A1 | 1/2018 | Xi |
| 2018/0029585 A1 | 2/2018 | Tanimoto |
| 2018/0056748 A1 | 3/2018 | Grimes |
| 2018/0065438 A1 | 3/2018 | Ogawa et al. |
| 2018/0079272 A1 | 3/2018 | Aikin |
| 2018/0089901 A1 | 3/2018 | Rober et al. |
| 2018/0093707 A1 | 4/2018 | Tokioka et al. |
| 2018/0105082 A1 | 4/2018 | Knox |
| 2018/0126816 A1 | 5/2018 | Kondo et al. |
| 2018/0134111 A1 | 5/2018 | Toyohira et al. |
| 2018/0162186 A1 | 6/2018 | Anderson et al. |
| 2018/0162187 A1 | 6/2018 | Trangbaek |
| 2018/0195570 A1 | 7/2018 | Churchill et al. |

(56) References Cited

U.S. PATENT DOCUMENTS

| | | |
|---|---|---|
| 2018/0208009 A1 | 7/2018 | McGuire et al. |
| 2018/0222274 A1 | 8/2018 | Davis et al. |
| 2018/0297587 A1 | 10/2018 | Kasaiezadeh Mahabadi et al. |
| 2018/0345747 A1 | 12/2018 | Boon et al. |
| 2018/0370314 A1 | 12/2018 | Higle |
| 2019/0023094 A1 | 1/2019 | Panagis et al. |
| 2019/0118604 A1 | 4/2019 | Suplin et al. |
| 2019/0193505 A1 | 6/2019 | Balogh et al. |
| 2019/0248203 A1 | 8/2019 | Krehmer et al. |
| 2019/0308484 A1 | 10/2019 | Belter et al. |
| 2020/0088214 A1 | 3/2020 | Woodard et al. |
| 2020/0171907 A1 | 6/2020 | Hall et al. |
| 2020/0180386 A1 | 6/2020 | Tabata et al. |
| 2020/0216128 A1 | 7/2020 | Doerksen |
| 2021/0061046 A1 | 3/2021 | Simon et al. |

FOREIGN PATENT DOCUMENTS

| | | | |
|---|---|---|---|
| CN | 208439009 U | 1/2019 | |
| DE | 19853876 A1 | 5/2000 | |
| DE | 19850169 C1 | 7/2000 | |
| DE | 102008025020 A1 | 11/2009 | |
| DE | 102009060213 A1 | 6/2011 | |
| DE | 102010041404 A1 | 3/2012 | |
| DE | 202012002846 U1 | 7/2012 | |
| DE | 102015003530 A1 | 9/2016 | |
| DE | 102016000686 A1 | 7/2017 | |
| DE | 102017106810 A1 | 10/2018 | |
| DE | 102018208774 A1 | 12/2019 | |
| EP | 0895882 A1 * | 2/1999 | ............ B60G 21/05 |
| EP | 1693233 B1 | 4/2009 | |
| EP | 2072855 A1 | 6/2009 | |
| EP | 2199121 A1 | 6/2010 | |
| EP | 2233330 B1 | 2/2013 | |
| EP | 3088230 A1 | 11/2016 | |
| GB | 2220625 A | 1/1990 | |
| GB | 2437633 A | 10/2007 | |
| JP | H08197931 A | 8/1996 | |
| JP | 2004155258 A | 6/2004 | |
| JP | 2004237824 A | 8/2004 | |
| JP | 2006071098 A | 3/2006 | |
| JP | 2006200734 A | 8/2006 | |
| JP | 2006327295 A | 12/2006 | |
| JP | 2009185955 A | 8/2009 | |
| JP | 2009191944 A | 8/2009 | |
| JP | 2009274600 A | 11/2009 | |
| JP | 2010-091030 A | 4/2010 | |
| JP | 2011016475 A | 1/2011 | |
| JP | 2011122644 A | 6/2011 | |
| JP | 2012002300 A | 1/2012 | |
| JP | 2012167757 A | 9/2012 | |
| JP | 2013244841 A | 12/2013 | |
| JP | 5623006 B2 | 11/2014 | |
| JP | 5796315 B2 | 10/2015 | |
| KR | 101509600 B1 | 4/2015 | |
| KR | 20170095073 A | 8/2017 | |
| WO | 9304883 A1 | 3/1993 | |
| WO | 2011148792 A1 | 12/2011 | |
| WO | 2012028228 A2 | 3/2012 | |
| WO | 2014004118 A1 | 1/2014 | |
| WO | 2014004119 A1 | 1/2014 | |
| WO | 2014094934 A1 | 6/2014 | |
| WO | 2015153811 A1 | 10/2015 | |
| WO | 2015169530 A1 | 11/2015 | |
| WO | 2016120044 A1 | 8/2016 | |
| WO | 2017055151 A1 | 4/2017 | |

OTHER PUBLICATIONS

Tenneco, "Integrated Kinetic, H2 CES System, Ride Control Innovation, Accelerated", Rev. Sep. 2011, 4 pp.

porsche.com, "Porsche AG: Porsche 918 RSR—Racing Laboratory With Even Higher-Performance Hybrid Drive—Porsche USA", Current Press Releases dated Jan. 10, 2011, Downloaded Mar. 13, 2017, www.porsche.com/usa/aboutporsche/pressreleases/pag/?pool=international-de&id-2011-01-10, 6 pp.

autoblog.com, "Porsche (finally) Unleashes Full, Official Details in 918 Spyder—Autoblog", Sep. 9, 2013, www.autoblog.com/2013/09/09/porsche-official-detials-918-spyder-frankfurt/, Downloaded Mar. 13, 2017, 26 pp.

press.porsche.com, "Introducing the Porsche 918 Spyder", Date Unknown, http://press.porsche.com/news/release.php?id-787, Downloaded Mar. 13, 2017, 7 pp.

Bolognesi, P., et al., "FEM Modeling and Analysis of a Novel Rotary-Linear Isotropic Brushless Machine", XIX International Conference of Electrical Machines—ICEM 2010, Rome (6 pp).

Xu, Lei, et. al., "Design and Analysis of a Double-Stator Linear-Rotary Permanent-Magnet Motor", IEEE Transactions on Applied Superconductivity, vol. 26, No. 4, Jun. 2016, (4 pp).

SAE International, "Michelin re-invents the wheel", Oct. 14, 2008, Downloaded Sep. 7, 2017, http://articles.sae.org/4604/ (2 pp).

Edren, Johannes, "Motion Modelling and Control Strategies of Over-Actuated Vehicles", Doctoral Thesis, Stockholm 2014 (56 pp).

daimler.com, "Suspension: The world's first suspension system with 'eyes'", https://media.daimler.com/marsMediaSite/en/instance/ko/Suspension-The-worlds-first-suspension-system-with-eyes.xhtml?oid=9904306, May 15, 2013 (6 pp).

youtube.com., KSSofficial, "Miniature Ball Screw With Ball Spline / English", Published on May 10, 2013, https://www.youtube.com/watch?v=vkcxmM0iC8U (2 pp).

Nippon Bearing, "Ball Screw Spline SPBR/SPBF", Product Description, Date Unknown, Downloaded Jun. 28, 2019, https://www.nbcorporation.com/shop/ball-spline/spbr-spbf/ (2 pp).

Wikipedia, "Trailing-arm suspension", https://en.wikipedia.org/wiki/Trailing-arm_suspension, downloaded Sep. 3, 2019 (2 pp).

Cosford, J., "Is it a fair fight? Hydraulics vs. electrics", https://www.mobilehydraulictips.com/fair-fight-hydraulics-vs-electrics/, Mar. 28, 2014 (10 pp).

* cited by examiner

MOTION CONTROL SYSTEMS

CROSS-REFERENCE TO RELATED APPLICATIONS

This patent application is a continuation application of U.S. patent application Ser. No. 16/850,369, filed on Apr. 16, 2020, which claims the benefit of U.S. Provisional Application No. 62/939,714, filed on Nov. 25, 2019, and also claims the benefit of U.S. Provisional Application No. 62/856,294, filed on Jun. 3, 2019, the contents of which are herein incorporated by reference herein in their entireties.

TECHNICAL FIELD

The application relates generally to motion control systems.

BACKGROUND

A motion control system may include a number of different types of components, such as dampers, springs, and bushings. The components may be passive or active. Passive components are mechanical devices that react to forces applied to them, typically by controlling the rate of movement away from a neutral position and then causing the system to return to the neutral position. Active components are controlled systems that apply forces based on observed states, such as measured acceleration values. For example, active components may be actuated based in part on relative acceleration measurements that measure acceleration of the sprung mass relative to the unsprung mass.

SUMMARY

One aspect of the disclosure is a suspension system for a vehicle. The vehicle has a vehicle body, a first wheel assembly that includes a first wheel hub, and a second wheel assembly that includes a second wheel hub. The suspension system includes a crossbar that is pivotally connected to the first wheel hub of the first wheel assembly and is pivotally connected to the second wheel hub of the second wheel assembly. The suspension system also includes a first active suspension actuator that is located near the first wheel assembly, is connected to the vehicle body, is connected to the crossbar, and supports the vehicle body with respect to the crossbar. The suspension system also includes a second active suspension actuator that is located near the second wheel assembly, is connected to the vehicle body, is connected to the crossbar, and supports the vehicle body with respect to the crossbar.

In some implementations of the suspension system, the crossbar is pivotally connected to the first wheel hub by a first ball joint and the crossbar is pivotally connected to the second wheel hub by a second ball joint.

In some implementations of the suspension system, the crossbar is connected to at least one of the first wheel assembly or the second wheel assembly by a lateral decoupling linkage to allow relative lateral motion of the first wheel assembly and the second wheel assembly.

The first active suspension actuator and the second active suspension actuator may each be mounted in a substantially vertical orientation. The first active suspension actuator and the second active suspension actuator may be linear actuators.

In some implementations, the suspension system also includes a first wheel hop damper that is connected to the crossbar and is controllable to counteract wheel hop of the first wheel assembly and a second wheel hop damper that is connected to the crossbar and is controllable to counteract wheel hop of the second wheel assembly. In some implementations, the suspension system also includes a first wheel hop damper that is connected to the first active suspension actuator and is controllable to counteract wheel hop of the first wheel assembly and a second wheel hop damper that is connected to the second active suspension actuator and is controllable to counteract wheel hop of the second wheel assembly.

Another aspect of the disclosure is a suspension system for a vehicle that has a vehicle body, a first wheel assembly, and a second wheel assembly. The suspension system includes a crossbar that is connected to the first wheel assembly and the second wheel assembly. The crossbar includes a first crossbar portion that is connected to the first wheel assembly, the crossbar includes a second crossbar portion that is connected to the second wheel assembly, and the crossbar includes a connecting structure that connects the first crossbar portion to the second crossbar portion in a manner that allows relative lateral motion of the first crossbar portion and the second crossbar portion. The suspension system also includes a first active suspension actuator that is located near the first wheel assembly, is connected to the vehicle body, is connected to the crossbar, and supports the vehicle body with respect to the crossbar. The suspension system also includes a second active suspension actuator that is located near the second wheel assembly, is connected to the vehicle body, is connected to the crossbar, and supports the vehicle body with respect to the crossbar.

In some implementations of the suspension system, the connecting structure includes a telescopic joint that connects the first crossbar portion to the second crossbar portion.

In some implementations of the suspension system, the connecting structure includes a lateral decoupling linkage that connects the first crossbar portion to the second crossbar portion.

In some implementations of the suspension system, the first wheel assembly includes a first wheel hub, the second wheel assembly includes a second wheel hub, the crossbar is pivotally connected to the first wheel hub of the first wheel assembly, and the crossbar is pivotally connected to the second wheel hub of the second wheel assembly. The suspension system may also include a first ball joint that pivotally connects the crossbar to the first wheel hub and a second ball joint that pivotally connects the crossbar to the second wheel hub.

The first active suspension actuator and the second active suspension actuator may each be mounted in a substantially vertical orientation. The first active suspension actuator and the second active suspension actuator may be linear actuators.

Another aspect of the disclosure is a suspension system for a vehicle that has a vehicle body, a first wheel assembly, and a second wheel assembly. The suspension system includes a connecting bar that is connected to the first wheel assembly and the second wheel assembly. The suspension system also includes a first active suspension actuator that is located near the first wheel assembly, is connected to the vehicle body, is connected to the connecting bar, and supports the vehicle body with respect to the connecting bar. The suspension system also includes a second active suspension actuator that is located near the second wheel assembly, is connected to the vehicle body, is connected to the connecting bar, and supports the vehicle body with respect to the connecting bar. The suspension system also includes a lateral stabilizer that restrains lateral motion of the connecting bar.

In some implementations of the suspension system, the lateral stabilizer is connected to the connecting bar and to the vehicle body. The lateral stabilizer may include a Watt's linkage. The lateral stabilizer may include a Panhard rod.

In some implementations of the suspension system, the first wheel assembly includes a first wheel hub, the second wheel assembly includes a second wheel hub, the connecting bar is pivotally connected to the first wheel hub of the first wheel assembly, and the connecting bar is pivotally connected to the second wheel hub of the second wheel assembly. In some implementations, the suspension system also includes a first ball joint that pivotally connects the connecting bar to the first wheel hub, and a second ball joint that pivotally connects the connecting bar to the second wheel hub.

The first active suspension actuator and the second active suspension actuator may each be mounted in a substantially vertical orientation. The first active suspension actuator and the second active suspension actuator may be linear actuators.

Another aspect of the disclosure is a suspension system for a vehicle that has a vehicle body, a first wheel assembly that includes a first wheel hub, and a second wheel assembly that includes a second wheel hub. The suspension system includes a crossbar having a first lateral portion that is connected to the first wheel assembly, a second lateral portion that is connected to the second wheel assembly, a first longitudinal portion that is connected to the first lateral portion, a second longitudinal portion that is connected to the second lateral portion, and a central portion that extends between the first longitudinal portion and the second longitudinal portion such that central portion is longitudinally spaced from the first lateral portion and the second lateral portion by the first longitudinal portion and the second longitudinal portion. The suspension system also includes a first active suspension actuator that is located near the first wheel assembly, is connected to the vehicle body, is connected to the crossbar, and supports the vehicle body with respect to the crossbar, and a second active suspension actuator that is located near the second wheel assembly, is connected to the vehicle body, is connected to the crossbar, and supports the vehicle body with respect to the crossbar.

In some implementations, the central portion of the crossbar includes a joint that allows telescoping of the central portion of the crossbar. In some implementations, the central portion of the crossbar includes a joint that allows rotation of the first longitudinal portion of the crossbar and the second longitudinal portion of the crossbar.

Another aspect of the disclosure is a vehicle that includes a vehicle structure, a wheel assembly, a wheel hub that is connected to the wheel assembly, a suspension actuator that includes a housing, and a wheel mount that is connected to the housing of the suspension actuator to connect the wheel hub to the suspension actuator. The vehicle also includes a suspension arm that has a first end and a second end, is connected to the vehicle structure, and is connected to the suspension actuator. A first pivot joint connects the first end of the suspension arm to the housing of the suspension actuator. A second pivot joint that connects the second end of the suspension arm of the vehicle structure. The first pivot joint is configured to allow rotation around a first pivot axis that extends in a lateral direction with respect to the vehicle structure. The second pivot joint is configured to allow rotation around a second pivot axis that extends in the lateral direction with respect to the vehicle structure.

In some implementations of the vehicle, the first pivot axis is parallel to the second pivot axis. In some implementations of the vehicle, the first pivot joint includes an inner mounting structure, an outer mounting structure, and a first pivot pin that connects the housing of the suspension actuator to the first mounting structure and the second mounting structure such that the housing of the suspension actuator is located between the first mounting structure and the second mounting structure.

In some implementations of the vehicle, the wheel mount includes an upper mounting structure that is connected to the housing of the suspension actuator, a lower mounting structure that is connected to the housing of the suspension actuator, and a kingpin that is supported between the upper mounting structure and the lower mounting structure to allow rotation of the wheel hub and the wheel assembly to change a steering angle of the wheel assembly.

The vehicle may also include steering actuator that is connected to the wheel mount and is operable to rotate the kingpin to change the steering angle of the wheel assembly.

In some implementations of the vehicle, an upper end of the suspension actuator is connected to the vehicle structure. In some implementations of the vehicle, the suspension actuator includes an active suspension component. In some implementations of the vehicle, the suspension actuator includes a passive suspension component.

The vehicle may also include a steering linkage that is connected to the wheel hub. The vehicle may also include a propulsion linkage that is connected to the wheel hub. The vehicle may also include a steering actuator that is connected to the wheel mount and is operable to change a steering angle of the wheel assembly.

Another aspect of the disclosure is a vehicle that includes a vehicle structure, a crossbar that is connected to the vehicle structure, a wheel assembly, a wheel hub that is connected to the wheel assembly, a suspension actuator that includes a housing, and a wheel mount that is connected to the housing of the suspension actuator to connect the wheel hub to the suspension actuator. The vehicle also includes a suspension arm that has a first end and a second end, is connected to the crossbar, and is connected to the suspension actuator. A first pivot joint connects the first end of the suspension arm to the housing of the suspension actuator. A second pivot joint connects the second end of the suspension arm of the crossbar. The first pivot joint is configured to allow rotation around a first pivot axis that extends in a lateral direction with respect to the vehicle structure. The second pivot joint is configured to allow rotation around a second pivot axis that extends in the lateral direction with respect to the vehicle structure.

In some implementations of the vehicle, the crossbar is able to move with respect to the vehicle structure in one or more linear degrees of freedom. In some implementations of the vehicle, the crossbar is able to move with respect to the vehicle structure in one or more rotational degrees of freedom. In some implementations of the vehicle, the crossbar is connected to the vehicle structure by joints that constrain motion of the crossbar such that the crossbar is only able to move with respect to the vehicle structure in a generally longitudinal direction.

In some implementations of the vehicle, the first pivot axis is parallel to the second pivot axis.

In some implementations of the vehicle, the first pivot joint includes an inner mounting structure, an outer mounting structure, and a first pivot pin that connects the housing of the suspension actuator to the inner mounting structure and the outer mounting structure such that the housing of the suspension actuator is located between the inner mounting structure and the outer mounting structure.

In some implementations of the vehicle, the wheel mount includes an upper mounting structure that is connected to the housing of the suspension actuator, a lower mounting structure that is connected to the housing of the suspension actuator, and a kingpin that is supported between the upper mounting structure and the lower mounting structure to allow rotation of the wheel hub and the wheel assembly to change a steering angle of the wheel assembly.

In some implementations of the vehicle, the suspension actuator includes an active suspension component. In some implementations of the vehicle, the suspension actuator includes a passive suspension component.

DETAILED DESCRIPTION

The description herein relates to suspension systems that include a suspension component, referred to herein as a crossbar or a connecting bar, that extends laterally across the vehicle between opposed wheels (e.g., left and right wheels). The crossbar is connected to the wheels, for example, by connection to the hub of each wheel using a ball joint. At each side of the vehicle, adjacent to one of the opposed wheels, an active suspension actuator is connected to a body of the vehicle at a top end of the active suspension actuator, and is connected to the crossbar at a bottom end of the active suspension actuator.

The crossbar may be a beam or other generally rigid structure that spans the width of the car and transmits forces applied by the active actuator forces to the unsprung masses of the vehicle. By spanning the width of the vehicle between wheel assemblies, the crossbar allows application of active suspension forces to the wheel assemblies with very little moment applied to the wheel assemblies, and with a high motion ratio. By connecting the active suspension actuators to the crossbar instead of to the suspension linkages, the active suspension actuators can be mounted in a generally vertical orientation, which improves packaging.

The crossbar is included in the suspension system in addition to suspension linkages, and can be coupled with any traditional or active suspension-specific wheel kinematics configurations. The crossbar allows for improved load paths because it may be configured such that forces are transmitted between the tops of the active suspension actuators and the tires without coupling to other suspension member. The active suspension actuators that act upon the crossbar can be designed to carry dynamic loads only, but routing static loads through other suspension components (e.g., through passive suspension components).

The crossbars that are described herein are connected between two wheel assemblies and support the vehicle body using two active suspension actuators to improve the vertical load path from the road to the body. This arrangement may reduce or eliminate flanking load paths, such that most or all of the vertical loads are routed through the active suspension actuators, and coupling of vertical loads and lateral loads is reduced or eliminated. Thus, the active suspension actuators carry most or all of the static loads from the vehicle weight, and other components (e.g., bushings) can be designed without static load offset.

The crossbars described herein can be used in can be used in conjunction with kinematic arrangements that are intended to minimize coupling between longitudinal wheel motion and motion from other directions. This allows the longitudinal motion to be very soft with long travel and active control can be incorporated. By decoupling the vertical and longitudinal motions from other motions, dynamic effects such as bump steer and vibration can be minimized.

Figure 1:
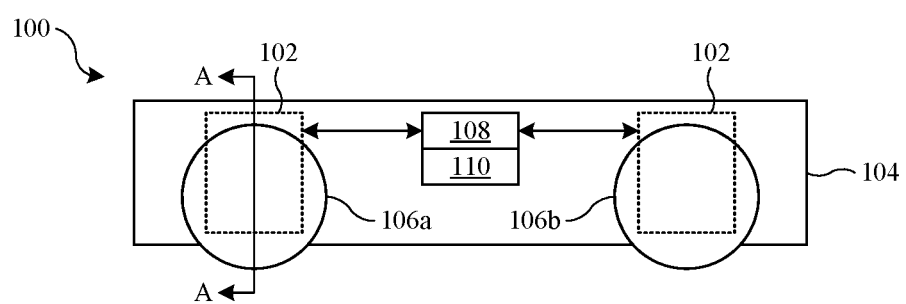
FIG. 1 is a side view illustration that shows a vehicle that includes a suspension system.

FIG. 1 is a side view illustration that shows a vehicle 100 that includes a suspension system 102. The vehicle 100 also includes a vehicle body 104 and wheel assemblies, which include a front-left wheel assembly 106a and a rear-left wheel assembly 106b in the illustrated example. The suspension system 102 includes passive and active components that support the sprung mass of the vehicle 100 with respect to the unsprung mass of the vehicle 100. The vehicle body 104 is part of the sprung mass of the vehicle, and is supported above the wheel assemblies, including the front-left wheel assembly 106a and the rear-left wheel assembly 106b, by the suspension system 102. The wheel assemblies, including the front-left wheel assembly 106a and the rear-left wheel assembly 106b, are part of the unsprung mass of the vehicle 100 and are supported by an underlying surface, such as a roadway surface. The configuration shown in FIG. 1 is generally applicable to the various examples of vehicles that will be shown and described herein.

The vehicle 100 may include a controller 108 and sensors 110 that are configured to control active components that are included in the suspension system 102. The controller 108 may be a conventional computing device (e.g., having components such as a processor and a memory) that is provided with computer program instructions that allow the controller 108 to generate commands that regulate operation of the active components of the suspension system 102 using sensor signals that are generated by the sensors 110 and are provided to the controller 108 as inputs. The sensors 110 may include, as examples, one or more accelerometers that measure motion of the sprung mass of the vehicle 100, one or more accelerometers that measure motion of the unsprung mass of the vehicle 100, one or more cameras that monitor conditions around the vehicle 100, and/or one or more three-dimensional sensors (e.g., LIDAR, structured light, etc.) that monitor conditions around the vehicle 100. As an example, the computer program instructions of the controller 108 may monitor a relative acceleration of the sprung mass and the unsprung mass, determine a force to be applied by the active components of the suspension system 102 in opposition to the relative acceleration of the sprung mass and the unsprung mass, and output a command to the active components of the suspension system 102 that causes the active components to apply the force.

The vehicle 100 may be configured as a conventional road-going vehicle. As examples, the vehicle 100 may be configured as a passenger car, a utility vehicle, a sport utility vehicle, a truck, a bus, or a trailer. The vehicle 100 may include various actuator systems in addition to the suspension system 102. As examples, the vehicle 100 may include a propulsion system, a braking system, and a steering system, which are not shown in FIG. 1.

Figure 2:
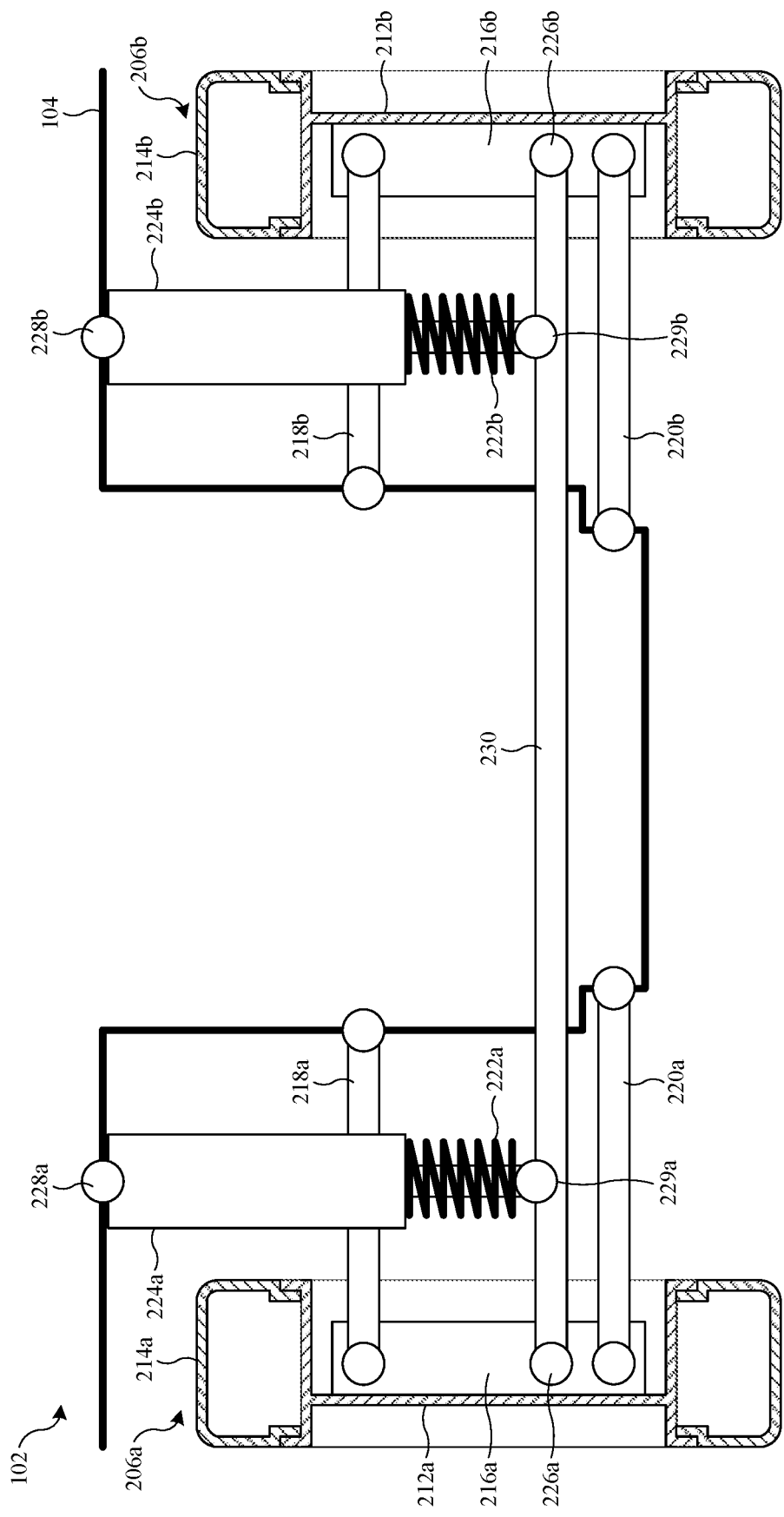
FIG. 2 is a cross-section illustration taken according to line A-A of FIG. 1 showing the suspension system.

FIG. 2 is a cross-section illustration taken according to line A-A of FIG. 1 showing a suspension system 102 according to a first example. The suspension system 102 supports a sprung mass, including a vehicle body 104, with respect to an unsprung mass of the vehicle, including wheel assemblies such as a left wheel assembly 206a and a right wheel assembly 206b. In the illustrated example, the left wheel assembly 206a and the right wheel assembly 206b are front wheel assemblies, and a similar configuration can be utilized for rear wheel assemblies. The general configuration is the same as that described with respect to the vehicle 100 of FIG. 1.

The left wheel assembly 206a includes a left wheel 212a, a left tire 214a, and a left wheel hub 216a. The left wheel 212a, the left tire 214a, and a left wheel hub 216a are all convention components. For example, the left wheel 212a may be a steel wheel of conventional design that supports the left tire 214a, which may be a pneumatic tire. The left wheel hub 216a is fixed against rotation by components of the suspension system 102. The left wheel 212a and the left tire 214a are supported by the left wheel hub 216a so that they may rotate. Propulsion, steering, and/or braking components may also be connected to and or integrated into the left wheel 212a and/or the left wheel hub 216a.

The right wheel assembly 206b is located on a laterally opposite side of the vehicle relative to the left wheel assembly 206a and includes a right wheel 212b, a right tire 214b, and a right wheel hub 216b, which are similar to the left wheel 212a, the left tire 214a, and a left wheel hub 216a.

To support the vehicle body 104 with respect to the left wheel assembly 206a, the suspension system 102 may include a left upper control arm 218a, a left lower control arm 220a, left passive suspension components 222a, and a left active suspension actuator 224a. The left upper control arm 218a and left lower control arm 220a connect the left wheel hub 216a to the vehicle body 104 such that the left wheel hub 216a is movable with respect to the vehicle body 104, primarily in a generally vertical direction, for example, by pivoting joints (e.g., joints that allow rotation one or more rotational degrees of freedom). The left passive suspension components 222a may be connected in parallel with the left active suspension actuator 224a in order to support substantially all of (e.g., at least 95% in an unloaded condition) the static load applied to the unsprung mass (e.g., the left wheel assembly 206a) by the sprung mass (e.g., the vehicle body 104). As examples, the passive suspension components 222a may include springs, air springs (which may be low-frequency active components), shock absorbers, struts, dampers, bushings, and/or other types of passive components. The left active suspension actuator 224a will be described further herein. The left passive suspension component 222a could alternatively be located otherwise in order to support the static load of the vehicle body 104. The arrangement of the left upper control arm 218a and the left lower control arm 220a is shown as an example and other arrangements can be used.

To support the vehicle body 104 with respect to the right wheel assembly 206b, the suspension system 102 may include a right upper control arm 218b, a right lower control arm 220b, right passive suspension components 222b and a right active suspension actuator 224b, which are similar to the left upper control arm 218a, the left lower control arm 220a, the left passive suspension components 222a, and the left active suspension actuator 224a as previously described.

The suspension system 102 includes a crossbar 230. The suspension system 102 also includes active suspension components that are configured to apply forces to the crossbar 230 as part of active suspension control. In the illustrated example, the active suspension components include the left active suspension actuator 224a and the right active suspension actuator 224b.

The crossbar 230 is a structure that extends laterally across the vehicle between the left wheel assembly 206a and the right wheel assembly 206b.

The crossbar 230 may be connected to the left wheel assembly 206a by connection to the left wheel hub 216a and the crossbar 230 may be connected to the right wheel assembly 206b by connected to the right wheel hub 216b. The connections of the crossbar 230 to the left wheel assembly 206a and the right wheel assembly 206b may be pivotal connections. For example, a first end of the crossbar 230 may be pivotally connected the left wheel hub 216a and a second end of the crossbar 230 may be pivotally connected to the right wheel hub 216b. By pivotally connecting the crossbar 230 to each of the left wheel hub 216a and the right wheel hub 216b, forces that are applied to the crossbar 230 are applied to the left wheel assembly 206a and to the right wheel assembly 206b.

Joints that allow pivotal movement in one or more rotational degrees of freedom may be used to connect the crossbar 230 to the left wheel hub 216a and to the right wheel hub 216b. For example, the crossbar 230 may be connected to the left wheel hub 216a by a left ball joint 226a and the crossbar 230 may be connected to the right wheel hub 216b by a right ball joint 226b.

The crossbar 230 is described as being connected to the left wheel hub 216a and the right wheel hub 216b. It should be understood that these connections and other connections may be direct connections or may be indirect connections that include other structures such as joints.

The left active suspension actuator 224a and the right active suspension actuator 224b are each operable to apply forces to the crossbar 230. Operation of the left active suspension actuator 224a and the right active suspension actuator 224b can be controlled to dampen accelerations of the vehicle body 104 relative to the wheel assemblies, including the left wheel assembly 206a and the right wheel assembly 206b. The left active suspension actuator 224a and the right active suspension actuator 224b may be linear actuators. As one example, the left active suspension actuator 224a and the right active suspension actuator 224b may be hydraulic piston-cylinder actuators. As another example, the left active suspension actuator 224a and the right active suspension actuator 224b may be pneumatic piston-cylinder actuators. As another example, the left active suspension actuator 224a and the right active suspension actuator 224b may be pneumatic air springs. As another example, the left active suspension actuator 224a and the right active suspension actuator 224b may be electromagnetic linear actuators. As another example, the left active suspension actuator 224a and the right active suspension actuator 224b may be ball screw linear actuators that are driven by electric motors. Other types of actuators may be used as the left active suspension actuator 224a and the right active suspension actuator 224b to implement active suspension control.

The left active suspension actuator 224a and the right active suspension actuator 224b are each connected to the vehicle body 104 and to the crossbar 230. These connections may be direct connections or may be indirect connections made using joints or other structures. The left active suspension actuator 224a and the right active suspension actuator 224b may each be connected to the vehicle body 104 and the crossbar 230 by rigid joints, by flexible joints, or by pivot joints that allow rotation in one or more rotational degrees of freedom.

In the illustrated example, the left active suspension actuator 224a is connected to the vehicle body 104 by the left upper joint 228a and to the crossbar 230 by the left lower joint 228b. The right active suspension actuator 224b is connected to the vehicle body 104 by the right upper joint 229a and to the crossbar 230 by the right lower joint 229b.

The left active suspension actuator 224a and the right active suspension actuator 224b may each be mounted in a substantially vertical orientation. As used herein, the term "substantially vertical orientation" includes orientations within ten degrees of a vertical orientation. By mounting each of the left active suspension actuator 224a and the right active suspension actuator 224b in a substantially vertical orientation, substantially vertical forces can be applied to the left wheel assembly 206a and the right wheel assembly 206b, and the horizontal component of the applied force is small relative to vertical component of the applied force.

The left active suspension actuator 224a is located near the left wheel assembly 206a and the right active suspension actuator 224b is located near the right wheel assembly 206b. For example, the left active suspension actuator 224a may be located in a left-side wheel well area defined by the vehicle body 104 and the right active suspension actuator 224b may be located in a right-side wheel well area defined by the vehicle body 104. When the left active suspension actuator 224a is used to apply substantially vertical forces to the left wheel assembly 206a, the effective pivot point of the crossbar 230 is located at the right end of the crossbar 230, such as at the right ball joint 226b. When the right active suspension actuator 224b is used to apply substantially vertical forces to the right wheel assembly 206b, the effective pivot point of the crossbar 230 is located at the left end of the crossbar 230, such as at the left ball joint 226a.

Figure 3:
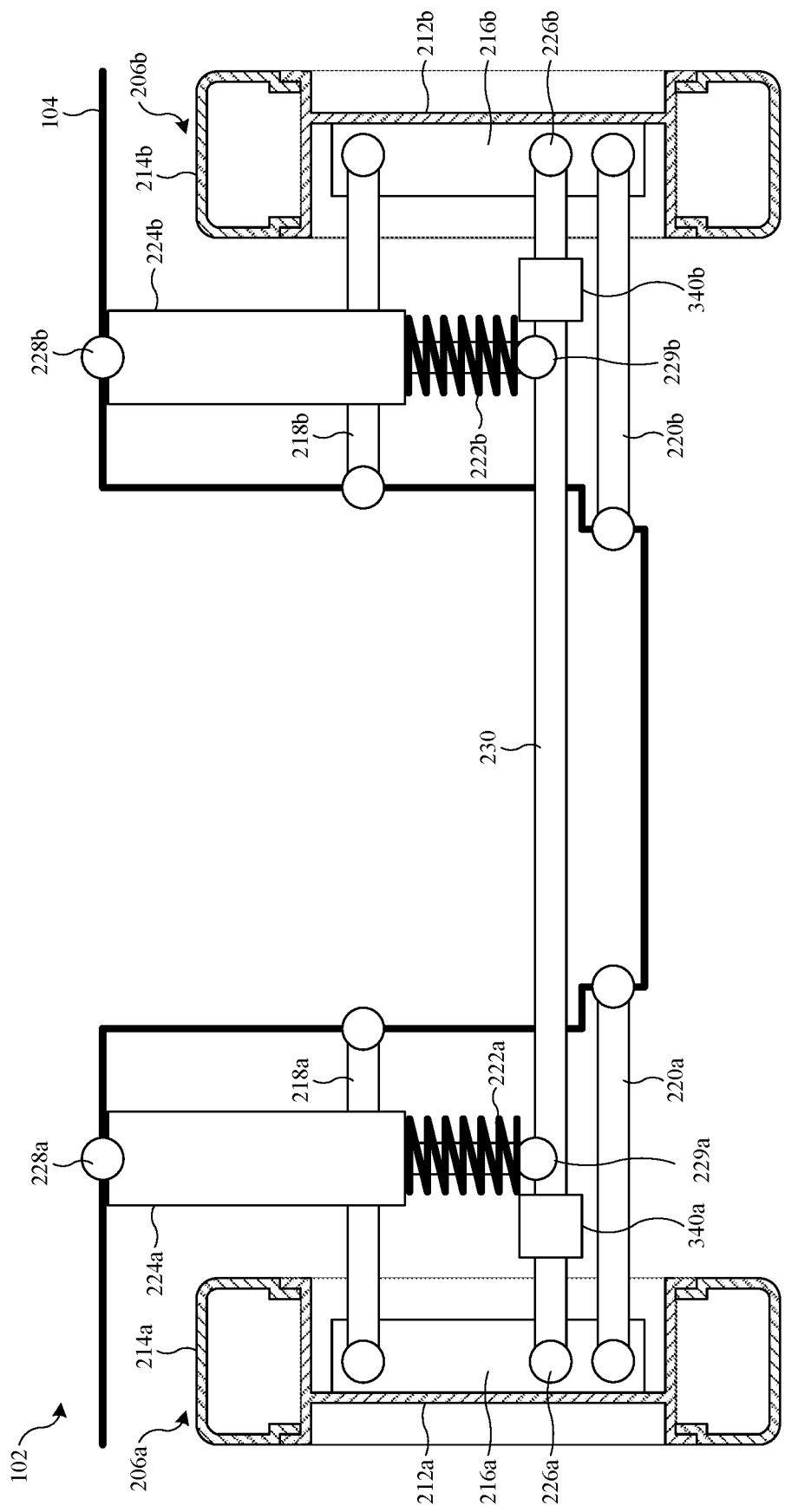
FIG. 3 is a cross-section illustration taken according to line A-A of FIG. 1 showing an alternative implementation of the suspension system in which wheel hop dampers are located on a crossbar.

FIG. 3 is a cross-section illustration taken according to line A-A of FIG. 1 showing an alternative implementation of the suspension system 102 in which wheel hop dampers, including a left wheel hop damper 340a, and a right wheel hop damper 340b, are located on the crossbar 230. The left wheel hop damper 340a is connected to the crossbar 230 and is controllable to counteract wheel hop of the left wheel assembly 206a, and the right wheel hop damper 340b is connected to the crossbar 230 and is controllable to counteract wheel hop of the right wheel assembly 206b. As an example, the wheel hop dampers 340a, 340b may include a tuned mass damper and/or a reaction mass actuator. Other active components may be used as the wheel hop dampers 340a, 340b to control wheel hop.

In the illustrated example, the left wheel hop damper 340a is positioned on the crossbar 230 between the left active suspension actuator 224a and the left wheel hub 216a, and the right wheel hop damper 340b is positioned on the crossbar 230 between the right active suspension actuator 224b and the right wheel hub 216b.

It should be that the wheel hop dampers 340a, 340b could be positioned elsewhere on the crossbar 230. In addition, the wheel hop dampers 340a, 340b could be positioned on the left wheel assembly 206a and the right wheel assembly 206b, for example, on the left wheel hub 216a and one the right wheel hub 216b.

Figure 4:
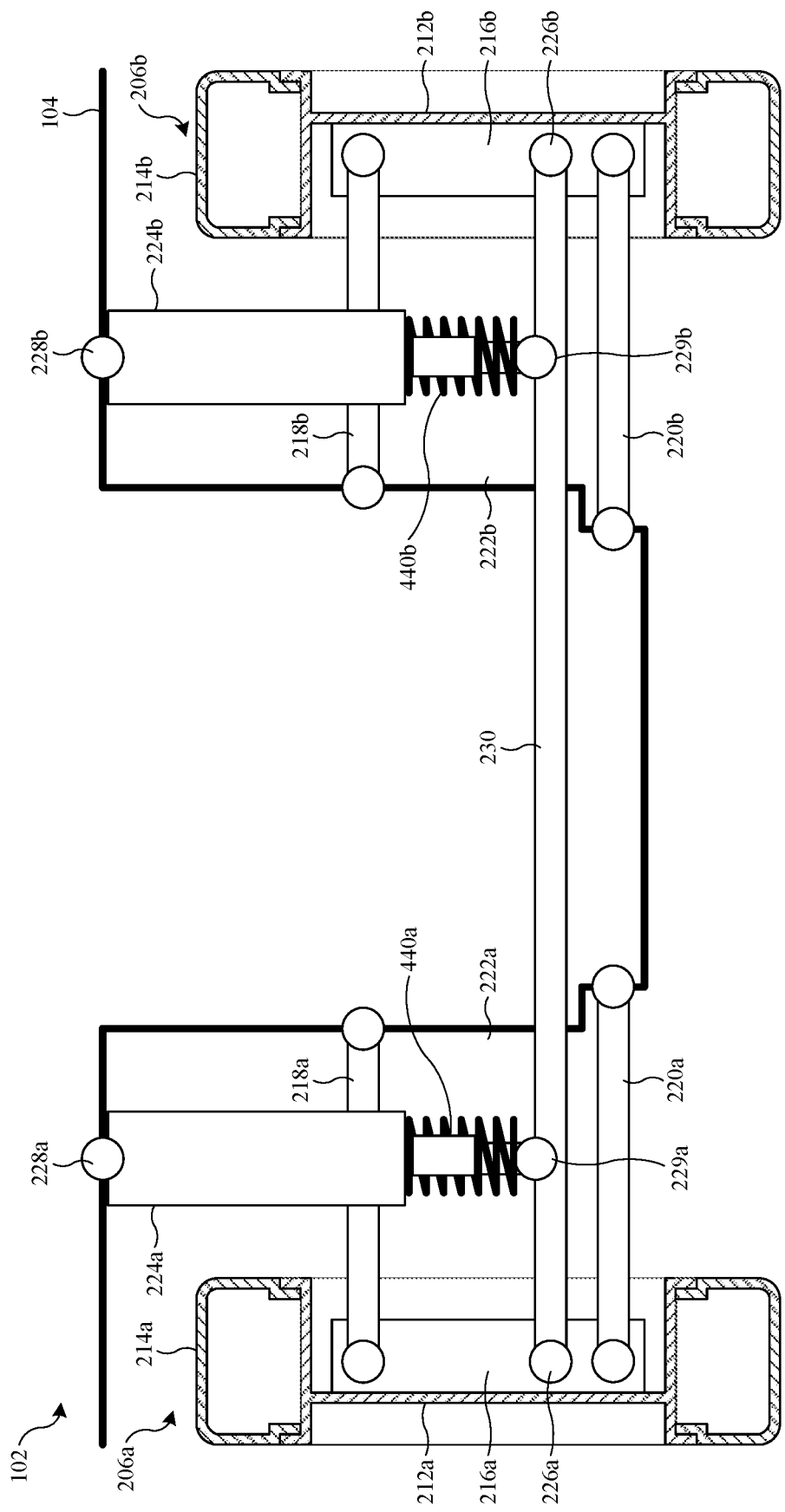
FIG. 4 is a cross-section illustration taken according to line A-A of FIG. 1 showing an alternative implementation of the suspension system in which wheel hop dampers are located on active suspension actuators.

FIG. 4 is a cross-section illustration taken according to line A-A of FIG. 1 showing an alternative implementation of the suspension system 102 in which wheel hop dampers, including a left wheel hop damper 440a and a right wheel hop damper 440b, are located on the left active suspension actuator 224a and the right active suspension actuator 224b. The left wheel hop damper 440a is connected to the left active suspension actuator 224a to counteract wheel hop of the left wheel assembly 206a, and the right wheel hop damper 340b is connected to right active suspension actuator 224b to counteract wheel hop of the right wheel assembly 206b. The wheel hop dampers 440a, 440b may be purely passive components, purely active components that are controllable (e.g., by the controller 108) in response to sensed conditions (e.g., acceleration values) to counteract wheel hop, or passive and active components in combination. As an example, the wheel hop dampers 440*a*, 440*b* may include a tuned mass damper and/or a reaction mass actuator. The tuned mass damper is an example of a passive wheel hop-dampening component and the reaction mass actuator is an example of an active wheel hop-dampening component. Other active components may be used as the wheel hop dampers 440*a*, 440*b* to control wheel hop.

It should be understood that the wheel hop dampers that are described with respect to FIGS. 3-4 may be included in any of the implementations of the suspensions that are described herein.

Figure 5:
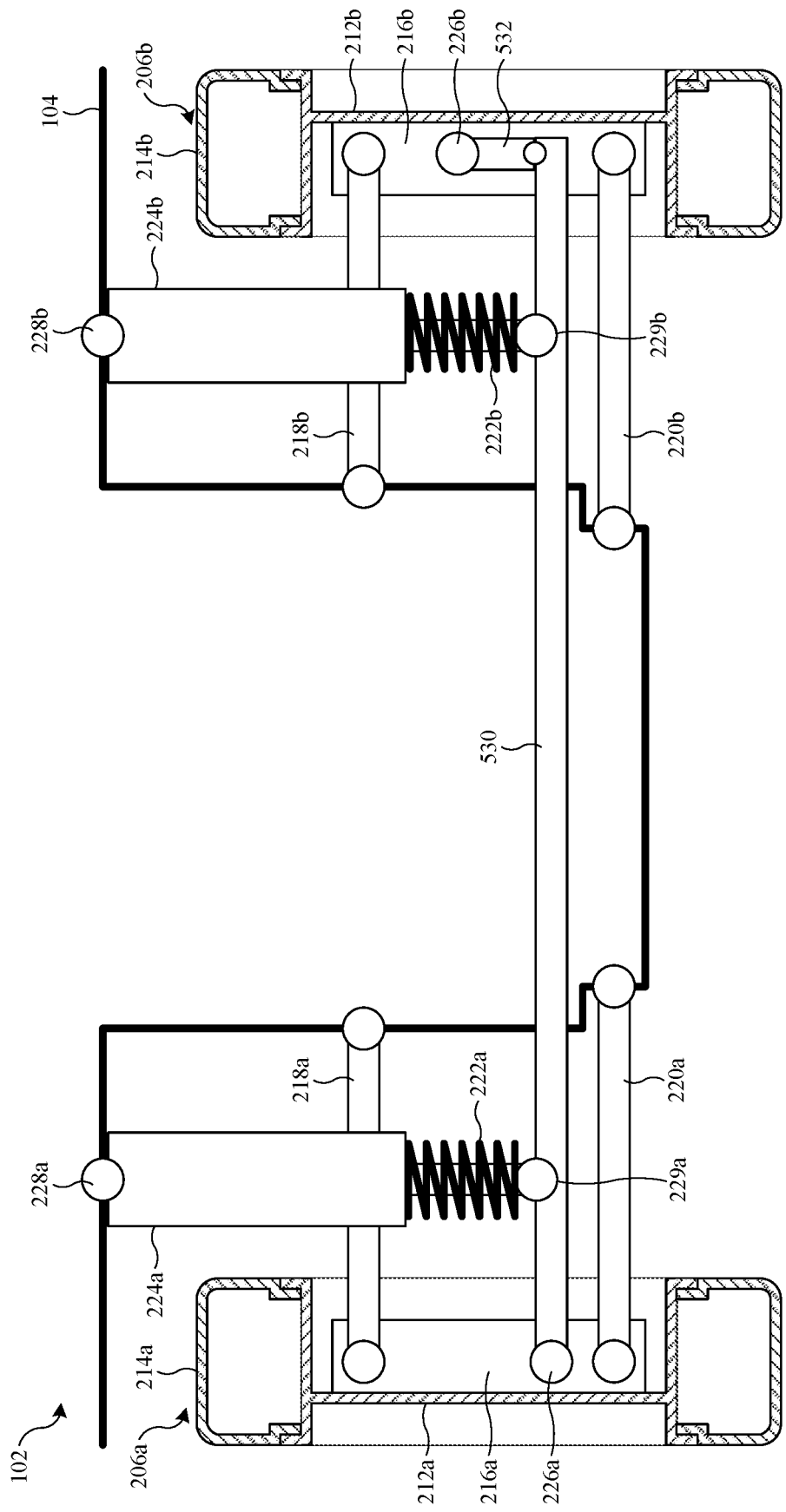
FIG. 5 is a cross-section illustration taken according to line A-A of FIG. 1 showing an alternative implementation of the suspension system in which a crossbar is connected to a wheel assembly by a lateral decoupling linkage.

FIG. 5 is a cross-section illustration taken according to line A-A of FIG. 1 showing an alternative implementation of the suspension system in which a crossbar 530 is connected to the right wheel assembly 206*b* by a lateral decoupling linkage 532. The crossbar 530 is similar to the crossbar 230 except as described herein. The lateral decoupling linkage 532 is pivotally connected to a right end of the crossbar 530 and is pivotally connected to the right wheel hub 216*b*, for example, by the right ball joint 226*b*. The ends of the lateral decoupling linkage 532 are offset vertically with respect to each other, which allows the lateral distance between the left wheel assembly 206*a* and the right wheel assembly 206*b* to vary slightly during operation of the vehicle 100. A single lateral decoupling linkage is shown. It should be understood that the lateral decoupling linkage could instead be at the left end of the crossbar 230, or that lateral decoupling linkages could be provided at both ends of the crossbar 230. Thus, the crossbar 230 may be connected to at least one of the left wheel assembly 206*a* or the right wheel assembly 206*b* by a lateral decoupling linkage, such as the lateral decoupling linkage 532, to allow relative lateral motion of the left wheel assembly 206*a* and the right wheel assembly 206*b*.

Figure 6:
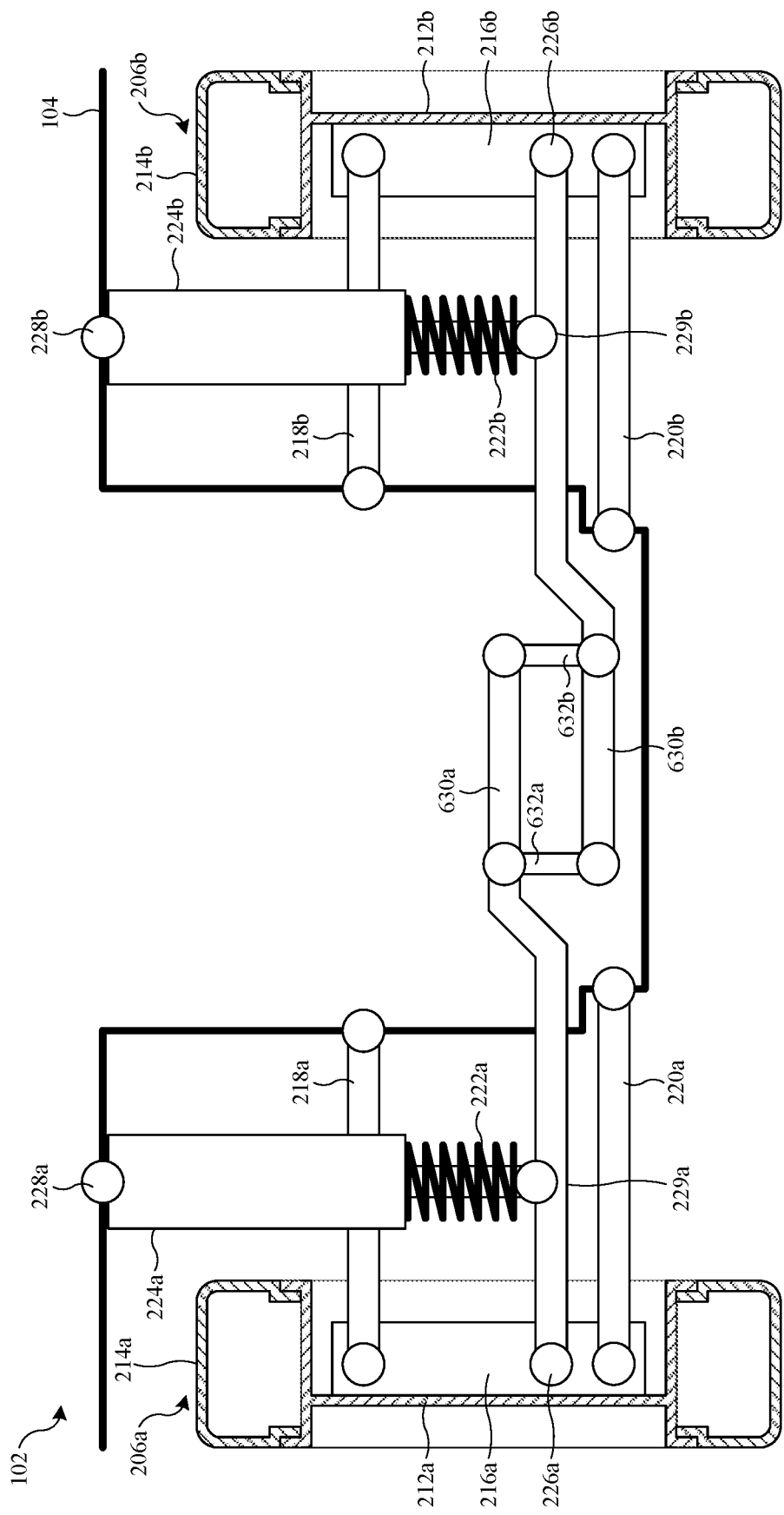
FIG. 6 is a cross-section illustration taken according to line A-A of FIG. 1 showing an alternative implementation of the suspension system in which a first crossbar portion is connected to a second crossbar portion by a lateral decoupling linkage.

FIG. 6 is a cross-section illustration taken according to line A-A of FIG. 1 showing an alternative implementation of the suspension system 102 in which a left crossbar portion 630*a* is connected to a right crossbar portion 630*b* by a lateral decoupling linkage. The lateral decoupling linkage is a connecting structure that connects the left crossbar portion 630*a* to the right crossbar portion 630*b* in a manner that allows relative lateral motion of the left crossbar portion 630*a* and the right crossbar portion 630*b*.

In the illustrated example, the lateral decoupling linkage is defined by a first link 632*a* having a first end pivotally connected to the left crossbar portion 630*a* and a second end pivotally connected to the right crossbar portion 630*b*, and a second link 632*b* having a first end pivotally connected to the left crossbar portion 630*a* and a second end pivotally connected to the right crossbar portion 630*b*. In combination with the left crossbar portion 630*a* and the right crossbar portion 630*b*, the first link 632*a* and the second link 632*b* define a four-bar linkage arrangement that allows a small amount of relative lateral motion of the left crossbar portion 630*a* and the right crossbar portion 630*b*.

Thus, the implementation of the suspension system 102 that is shown in FIG. 6 includes a crossbar that includes a first crossbar portion that is connected to a first wheel assembly, a second crossbar portion that is connected to a second wheel assembly, and a connecting structure that connects the first crossbar portion to the second crossbar portion in a manner that allows relative lateral motion of the first crossbar portion and the second crossbar portion. In this example, the connecting structure is the lateral decoupling linkage that is defined by the first link 632*a* and the second link 632*b*.

Figure 7:
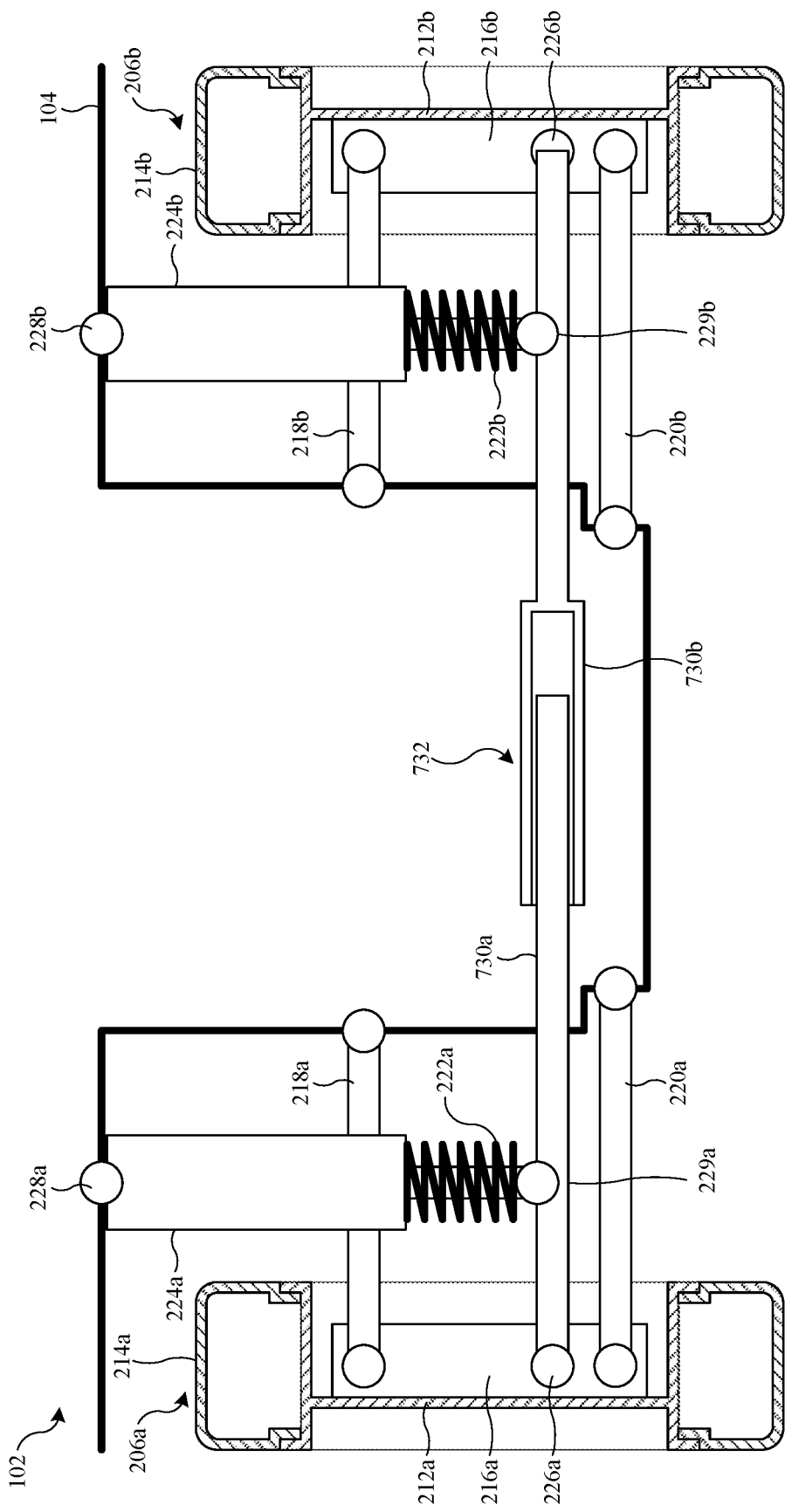
FIG. 7 is a cross-section illustration taken according to line A-A of FIG. 1 showing an alternative implementation of the suspension system in which a first crossbar portion is connected to a second crossbar portion by a telescopic joint.

FIG. 7 is a cross-section illustration taken according to line A-A of FIG. 1 showing an alternative implementation of the suspension system 102 in which a left crossbar portion 730*a* is connected to a right crossbar portion 730*b* by a telescopic joint 732. The telescopic joint 732 is a connecting structure that connects the left crossbar portion 730*a* to the right crossbar portion 730*b* in a manner that allows relative lateral motion of the left crossbar portion 730*a* and the right crossbar portion 730*b*.

The telescopic joint 732 connects the left crossbar portion 730*a* to the right crossbar portion 730*b* in a manner that allows the lateral distance between the left wheel assembly 206*a* and the right wheel assembly 206*b* to be varied based on insertion and retraction of the telescopic connection. In the illustrated example, the telescopic joint 732 is defined by an inner end portion of the left crossbar portion 730*a* that is received inside a cavity formed at an inner end portion of the right crossbar portion 730*b* such that it is slidable inside the cavity in the lateral direction.

Figure 8:
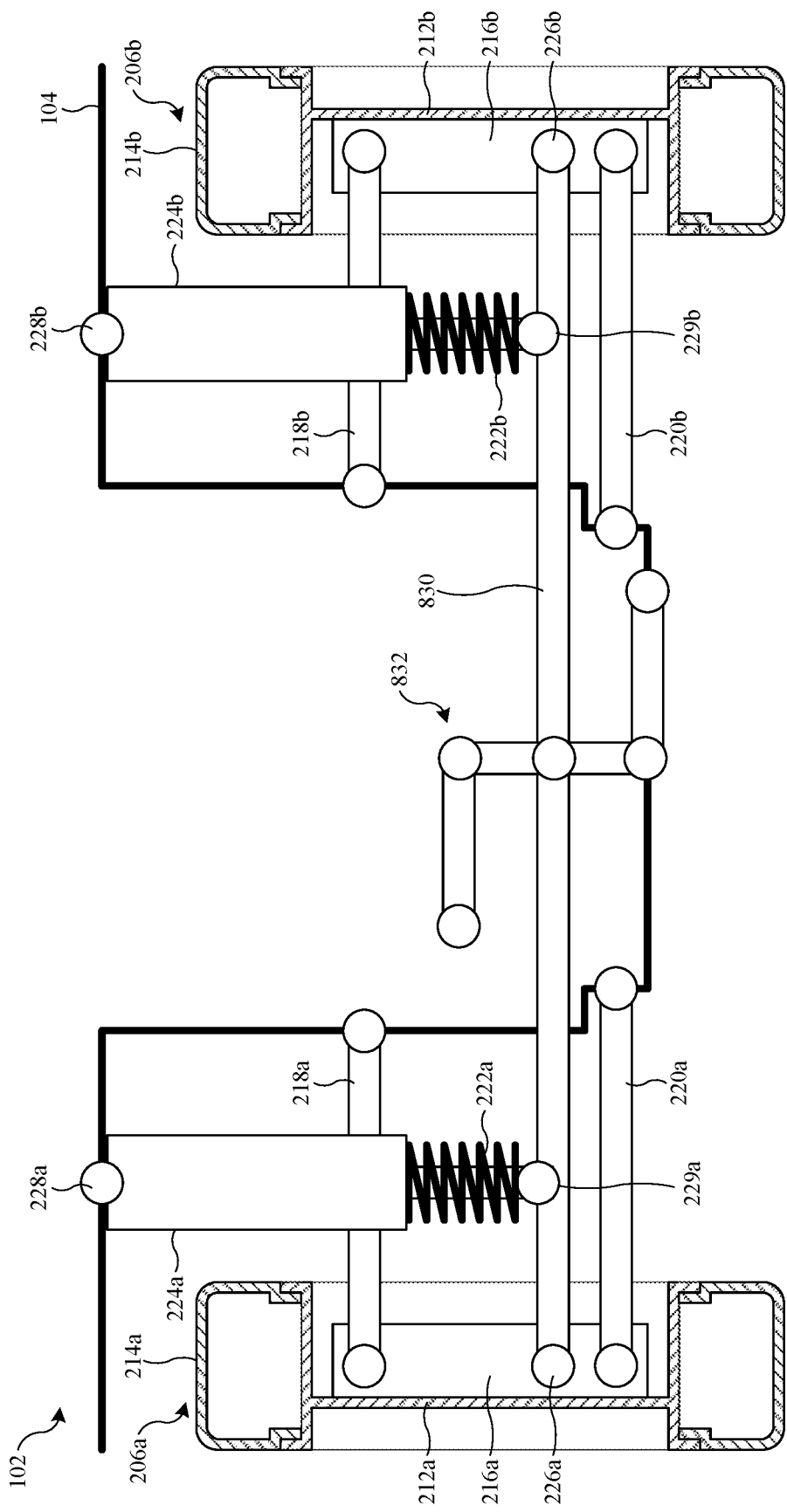
FIG. 8 is a cross-section illustration taken according to line A-A of FIG. 1 showing an alternative implementation of the suspension system in which lateral motion of a crossbar is restrained by a Watt's linkage.

FIG. 8 is a cross-section illustration taken according to line A-A of FIG. 1 showing an alternative implementation of the suspension system 102 in which the suspension kinematics of the suspension system 102 are laterally flexible, and a crossbar 830 is restrained against lateral motion by a Watt's linkage 832. The laterally flexible suspension kinematics of the suspension 102 may allow expansion and contraction of the lateral distance between the left wheel assembly 206*a* and the right wheel assembly 206*b*. The Watt's linkage 832 is a lateral stabilizer that restrains lateral motion of the crossbar 830. The Watt's linkage 832 is connected to the crossbar 830 and is also connected directly or indirectly to the vehicle body 104. The Watt's linkage 832 is a conventional mechanical device that constrains the crossbar 830 to vertical motion to restrain lateral drift of the crossbar 830.

Figure 9:
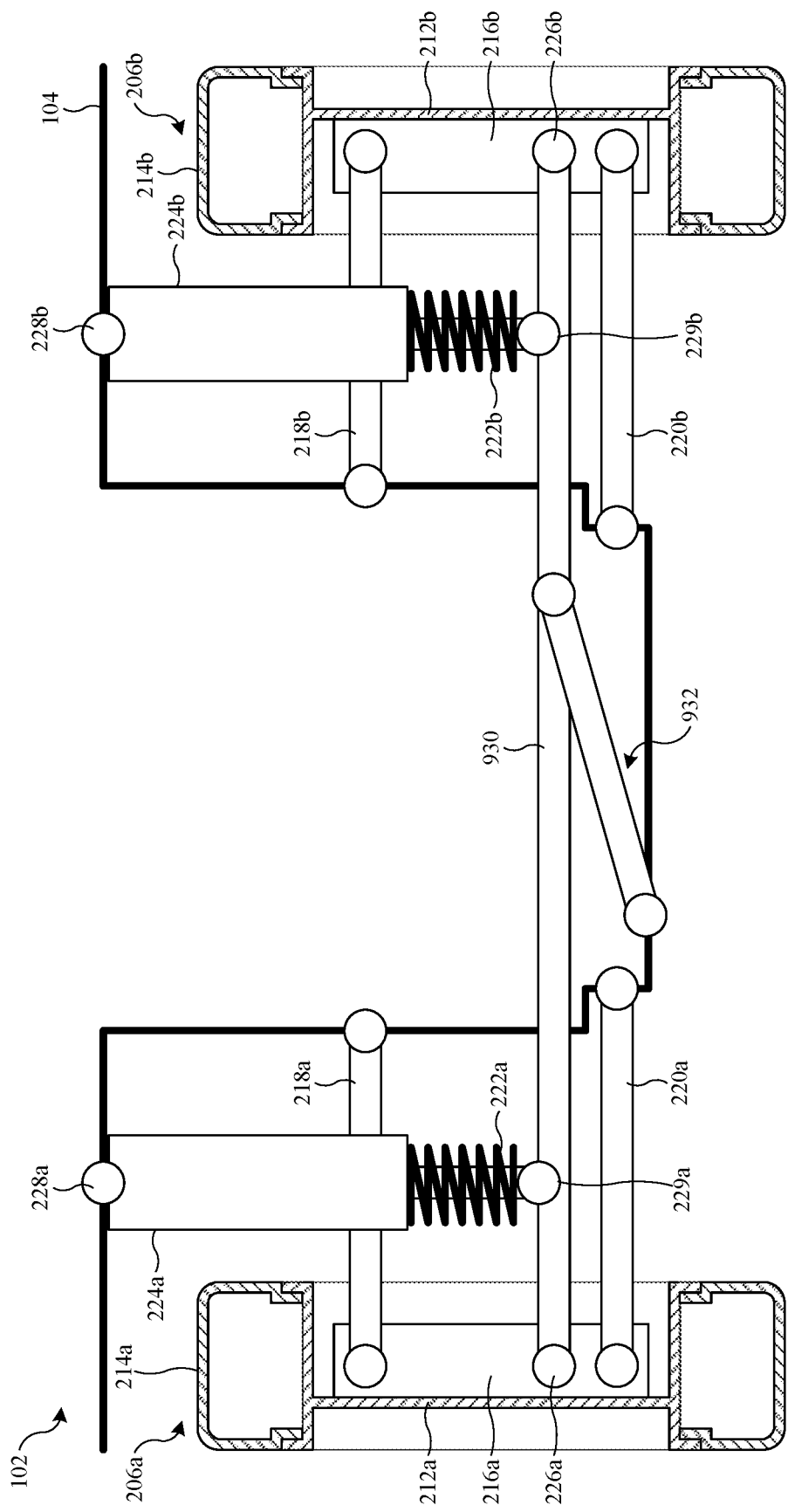
FIG. 9 is a cross-section illustration taken according to line A-A of FIG. 1 showing an alternative implementation of the suspension system in which lateral motion of a crossbar is restrained by a Panhard rod.

FIG. 9 is a cross-section illustration taken according to line A-A of FIG. 1 showing an alternative implementation of the suspension system in which the suspension kinematics of the suspension system 102 are laterally flexible, and a crossbar 930 is restrained against lateral motion by a Panhard rod 932. The laterally flexible suspension kinematics of the suspension system 102 may allow expansion and contraction of the lateral distance between the left wheel assembly 206*a* and the right wheel assembly 206*b*. The Panhard rod 932 is a lateral stabilizer that restrains lateral motion of the crossbar 930. The Panhard rod is connected to the crossbar 930 (e.g., by a pivot joint on a first end of the Panhard rod 932) and is also connected directly or indirectly to the vehicle body 104 (e.g., by a pivot joint on a second end of the Panhard rod 932. The Panhard rod 932 is a conventional mechanical device that constrains the crossbar 930 to vertical motion to restrain lateral drift of the crossbar 930.

Figure 10:
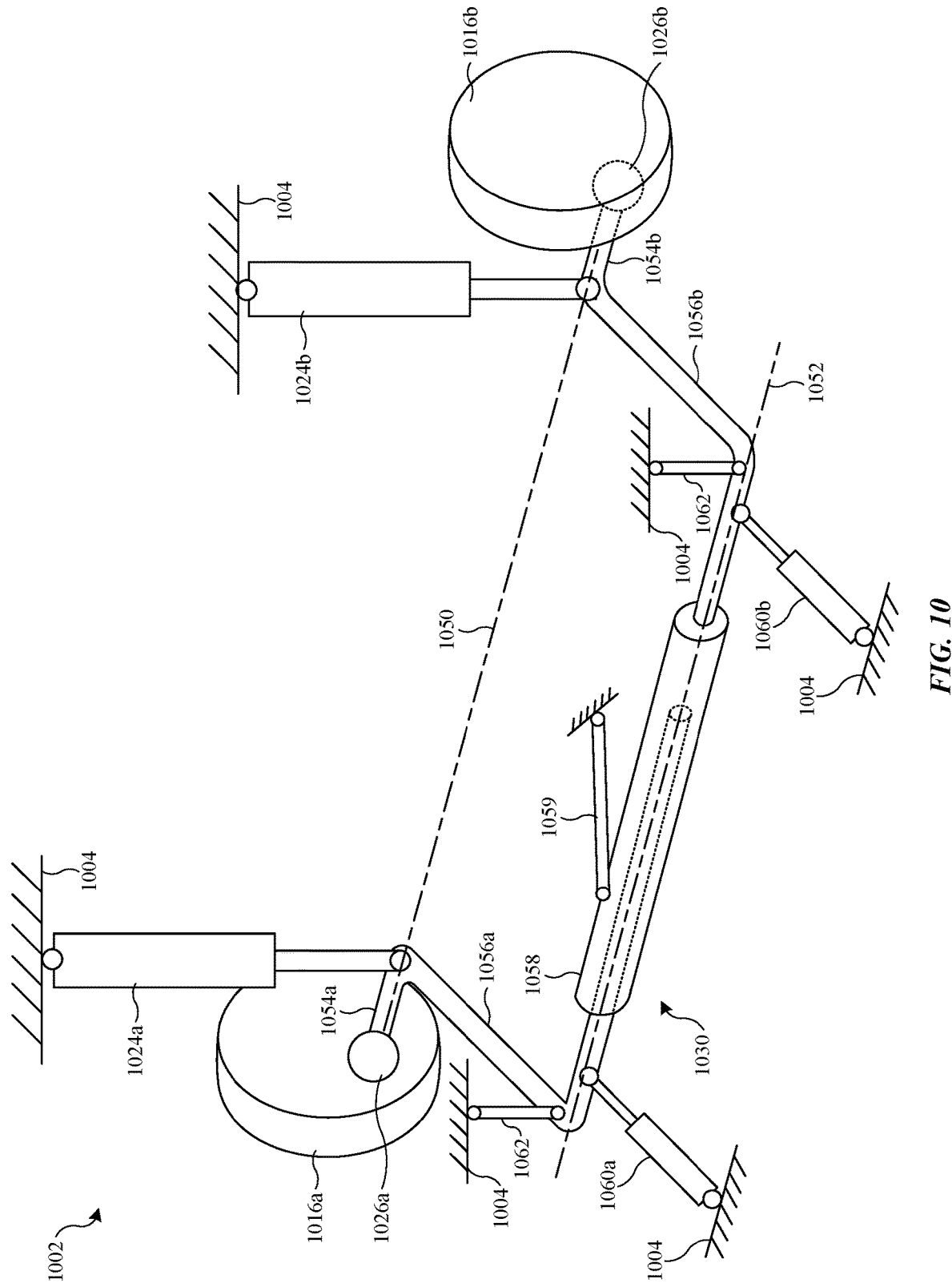
FIG. 10 is a perspective view illustration of a first alternative implementation of a suspension system that can be incorporated in the vehicle of FIG. 1.

FIG. 10 is a perspective view illustration of an alternative implementation of a suspension system 1002 that can be incorporated in a vehicle, such as the vehicle 100 of FIG. 1. The suspension system 1002 includes a crossbar 1030 that is connected to a left wheel hub 1016*a* and a right wheel hub 1016*b* by a left ball joint 1026*a* and a right ball joint 1026*b*. As will be explained herein, the left ball joint 1026*a*, the right ball joint 1026*b*, and part of the crossbar 1030 are aligned along a first axis 1050. Another portion of the crossbar 1030 lies along a second axis 1052 that is longitudinally spaced (e.g., frontward or rearward) relative to the first axis 1050.

The crossbar 1030 includes a left-side lateral portion 1054*a* and a right-side lateral portion 1054*b* that are connected to the left wheel hub 1016a and the right wheel hub 1016b by the left ball joint 1026a and the right ball joint 1026b. The left-side lateral portion 1054a and the right-side lateral portion 1054b each extend along the first axis 1050 in the lateral direction. A left active suspension actuator 1024a and a right active suspension actuator 1024b are each connected to the crossbar 1030 at inner ends of the left-side lateral portion 1054a and the right-side lateral portion 1054b. Upper ends of the left active suspension actuator 1024a and the right active suspension actuator 1024b are connected to a vehicle body 1004 by rigid, flexible, or pivotable joints. Lower ends of the left active suspension actuator 1024a and the right active suspension actuator 1024b are connected to the crossbar 1030 by rigid, flexible, or pivotable joints. Operation of the left active suspension actuator 1024a and the right active suspension actuator 1024b is otherwise as described with respect to the left active suspension actuator 224a and the right active suspension actuator 224b.

The crossbar 1030 includes a left-side longitudinal portion 1056a and a right-side longitudinal portion 1056b that extend either longitudinally rearward (as in the illustrated example) or longitudinally forward relative to the left-side lateral portion 1054a and the right-side lateral portion 1054b. At the opposite end of the left-side longitudinal portion 1056a and the right-side longitudinal portion 1056b from the front the left-side lateral portion 1054a and the right-side lateral portion 1054b, a central portion 1058 extends between the left-side longitudinal portion 1056a and the right-side longitudinal portion 1056b.

Longitudinal motion of the crossbar 1030 is controlled by a left damper 1060a and a right damper 1060b that are connected to the vehicle body 1004 and to the central portion 1058 of the crossbar 1030 by rigid, flexible, or pivotable joints. The left damper 1060a and the right damper 1060b may be mounted in a substantially longitudinal orientation so that they act in the longitudinal (front-to-back) direction. The left damper 1060a and the right damper 1060b may be passive components (e.g., springs or passive hydraulic dampers) or may be active components (e.g., hydraulic, pneumatic, or electric linear actuators).

The central portion 1058 of the crossbar 1030 may be mounted to the vehicle body 1004 in a manner that restrains vertical motion of the central portion of the crossbar 1030. The central portion of the crossbar 1030 may include a joint structure that accommodates rotation and/or telescoping. As one example, the joint structure may allow rotation of the left-side lateral portion 1054a and the left-side longitudinal portion 1056a around the second axis 1052 relative to the right-side lateral portion 1054b and the right-side longitudinal portion 1056b. As another example, the joint structure may allow relative lateral motion of the left-side lateral portion 1054a and the left-side longitudinal portion 1056a with respect to the right-side lateral portion 1054b and the right-side longitudinal portion 1056b. Optionally, a lateral stabilizer 1059 (e.g., a Watt's linkage or a Panhard rod) may connected the central portion 1058 of the crossbar 1030 to the vehicle body 1004 to restrain lateral motion. Optionally, a link 1062 may be connected to the central portion 1058 of the crossbar 1030 and extend (e.g., upward or substantially vertically) to a connection with the vehicle body 1004 to constrain motion of the crossbar 1030 with respect to the vehicle body 1004.

The crossbars described above with respect to FIGS. 1-10 can be used in can be used in conjunction with kinematic arrangements that are intended to minimize coupling between longitudinal wheel motion and motion from other directions, as will be described with respect to FIGS. 11-14.

Figure 11:
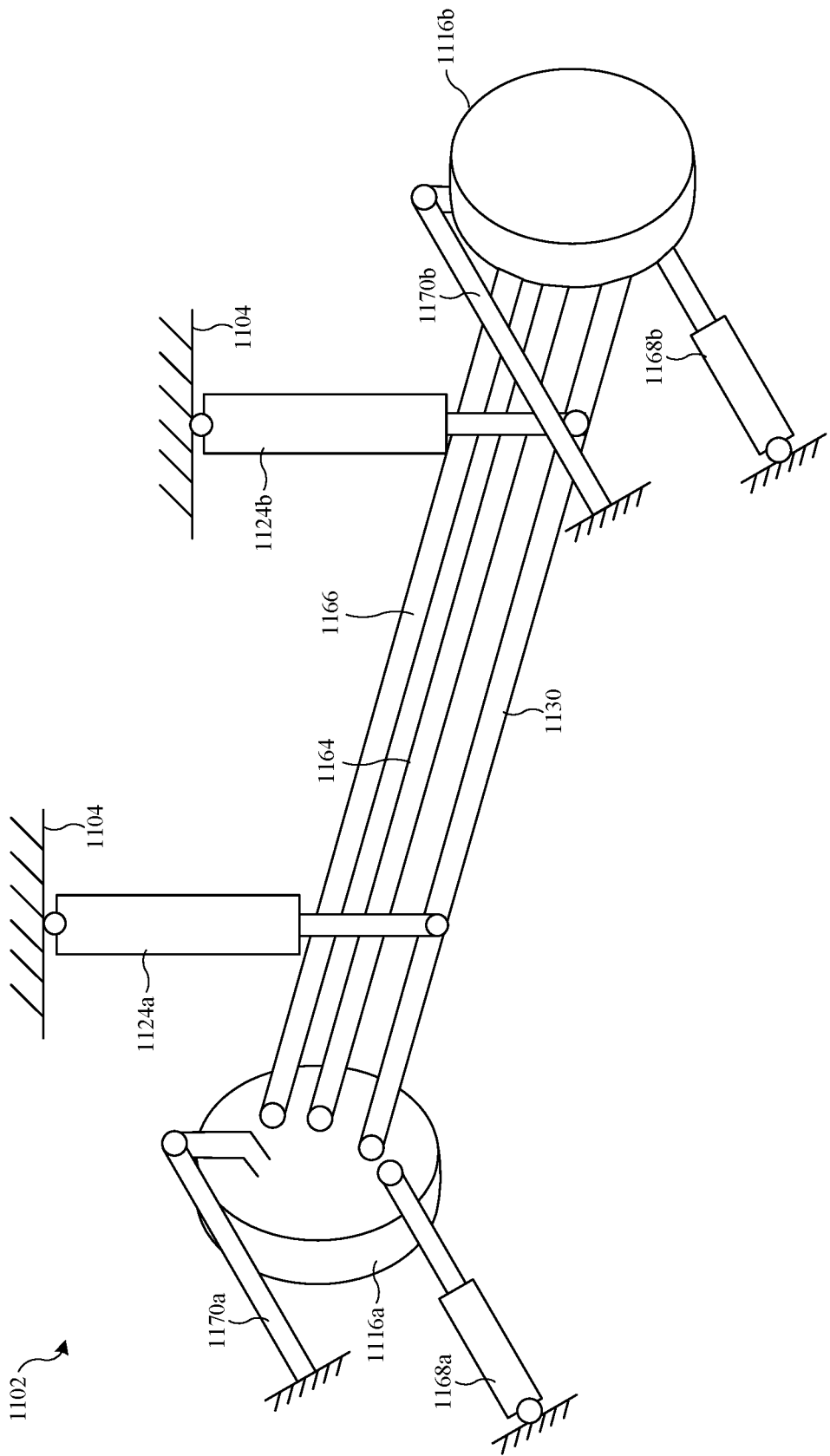
FIG. 11 is a perspective view illustration of a second alternative implementation of a suspension system that can be incorporated in the vehicle of FIG. 1.

FIG. 11 is a perspective view illustration of an alternative implementation of a suspension system 1102 that can be incorporated in a vehicle, such as the vehicle 100 of FIG. 1, that has a vehicle body 1104. The suspension system 1102 includes a crossbar 1130 that is connected to a left wheel hub 1116a and a right wheel hub 1116b by joints, such as ball joints, in the manner previously described in connection with the crossbars shown in FIGS. 1-10.

A left active suspension actuator 1124a and a right active suspension actuator 1124b are each connected to the crossbar 1130 near the left wheel hub 1116a and the right wheel hub 1116b. Upper ends of the left active suspension actuator 1124a and the right active suspension actuator 1124b are connected to a vehicle body 1104 by rigid, flexible, or pivotable joints. Lower ends of the left active suspension actuator 1124a and the right active suspension actuator 1124b are connected to the crossbar 1130 by rigid, flexible, or pivotable joints. Operation of the left active suspension actuator 1124a and the right active suspension actuator 1124b is otherwise as described with respect to the left active suspension actuator 224a and the right active suspension actuator 224b.

In addition to the crossbar 1130, a first lateral link 1164 and a second lateral link 1166 connect the left wheel hub 1116a to the right wheel hub 1116b. As with the crossbar 1130 joints, such as ball joints, may be used for the connections to the left wheel hub 1116a and the right wheel hub 1116b. The crossbar 1130, the first lateral link 1164 and the second lateral link 1166 may be anchored to the vehicle body 1104 to restrain lateral motion, for example, by a Watt's linkage or a Panhard rod. In combination, the crossbar 1130, the first lateral link 1164 and the second lateral link 1166 constrain the left wheel hub 1116a and the right wheel hub 1116b to motion within respective planes that are perpendicular to the crossbar 1130, the first lateral link 1164 and the second lateral link 1166. The first lateral link 1164 and the second lateral link 1166 may be structures that have other functions in addition to constraining the distance between the left wheel hub 1116a and the right wheel hub 1116b. For example, one of the first lateral link 1164 or the second lateral link 1166 may be a steering bar.

Longitudinal motion of the left wheel hub 1116a is regulated by a left lower longitudinal actuator 1168a and a left upper longitudinal link 1170a. The left lower longitudinal actuator 1168a may be an actively controlled actuator that is connected to a lower part of the left wheel hub 1116a and is configured to extend and retract to regulate longitudinal movement of the left wheel hub 1116a. The left upper longitudinal link 1170a is connected an upper part of the left wheel hub 1116a by a pivoting connection, for example, on a knuckle that extends upward from a body of the left wheel hub 1116a, and is also connected to the vehicle body 1104 (e.g., by a fixed connection). The left upper longitudinal link 1170a may be a single degree of freedom link that allows longitudinal motion of the left wheel hub 1116a by pivoting with respect to a pivot point located above the central axis of the left wheel hub 1116a.

Longitudinal motion of the right wheel hub 1116b is regulated by a right lower longitudinal actuator 1168b and a right upper longitudinal link 1170b which are identical to the left lower longitudinal actuator 1168a and left upper longitudinal link 1170a, as previously described.

Figure 12:
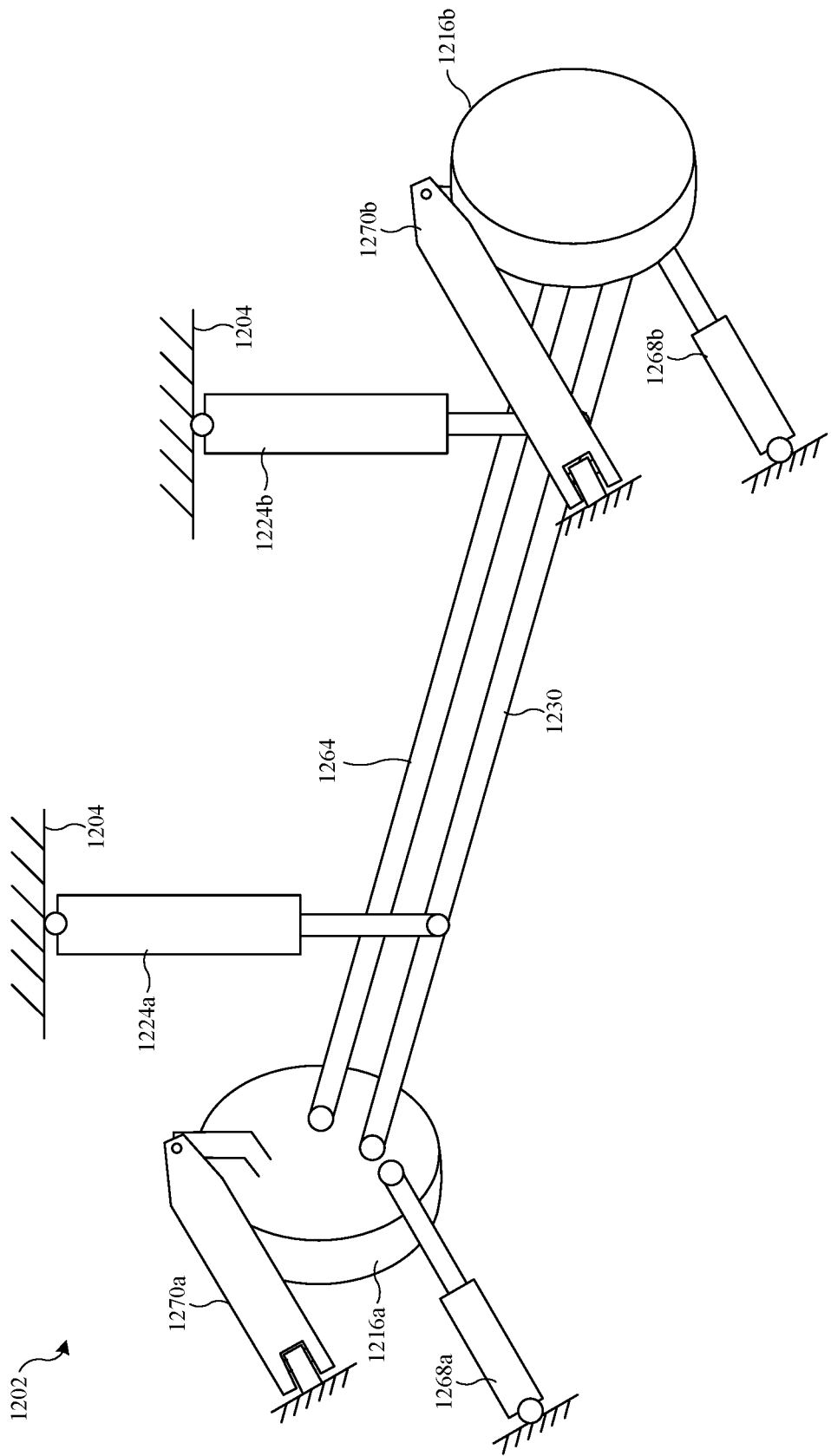
FIG. 12 is a perspective view illustration of a third alternative implementation of a suspension system that can be incorporated in the vehicle of FIG. 1.

FIG. 12 is a perspective view illustration of an alternative implementation of a suspension system 1202 that can be incorporated in a vehicle, such as the vehicle 100 of FIG. 1, that has a vehicle body 1204. The suspension system 1202 includes a crossbar 1230 that is connected to a left wheel hub 1216a and a right wheel hub 1216b by joints, such as ball joints, in the manner previously described in connection with the crossbars shown in FIGS. 1-10.

A left active suspension actuator 1224a and a right active suspension actuator 1224b are each connected to the crossbar 1230 near the left wheel hub 1216a and the right wheel hub 1216b. Upper ends of the left active suspension actuator 1224a and the right active suspension actuator 1224b are connected to a vehicle body 1204 by rigid, flexible, or pivotable joints. Lower ends of the left active suspension actuator 1224a and the right active suspension actuator 1224b are connected to the crossbar 1230 by rigid, flexible, or pivotable joints. Operation of the left active suspension actuator 1224a and the right active suspension actuator 1224b is otherwise as described with respect to the left active suspension actuator 224a and the right active suspension actuator 224b.

In addition to the crossbar 1230, a lateral link 1264 also connects the left wheel hub 1216a to the right wheel hub 1216b. As with the crossbar 1230, joints, such as ball joints, may be used for the connections of the lateral link 1264 to the left wheel hub 1216a and the right wheel hub 1216b. The crossbar 1230 and the lateral link 1264 may be anchored to the vehicle body 1204 to restrain lateral motion, for example, by a Watt's linkage or a Panhard rod. In combination, the crossbar 1230 and the lateral link 1264 constrain the motion of the left wheel hub 1216a and the right wheel hub 1216b.

Longitudinal motion of the left wheel hub 1216a is regulated by a left lower longitudinal actuator 1268a and a left upper A-arm 1270a. The left lower longitudinal actuator 1268a may be an actively controlled actuator that is connected to a lower part of the left wheel hub 1216a and is configured to extend and retract to regulate longitudinal movement of the left wheel hub 1216a. The left upper A-arm 1270a is connected an upper part of the left wheel hub 1216a by a pivoting connection, for example, on a knuckle that extends upward from a body of the left wheel hub 1216a, and is also connected to the vehicle body 1204 by a pivoting connection. Thus, the left upper A-arm 1270a may be a two degree of freedom link.

Longitudinal motion of the right wheel hub 1216b is regulated by a right lower longitudinal actuator 1268b and a right upper A-arm 1270b which are identical to the left lower longitudinal actuator 1268a and left upper A-arm 1270a, as previously described.

Figure 13:
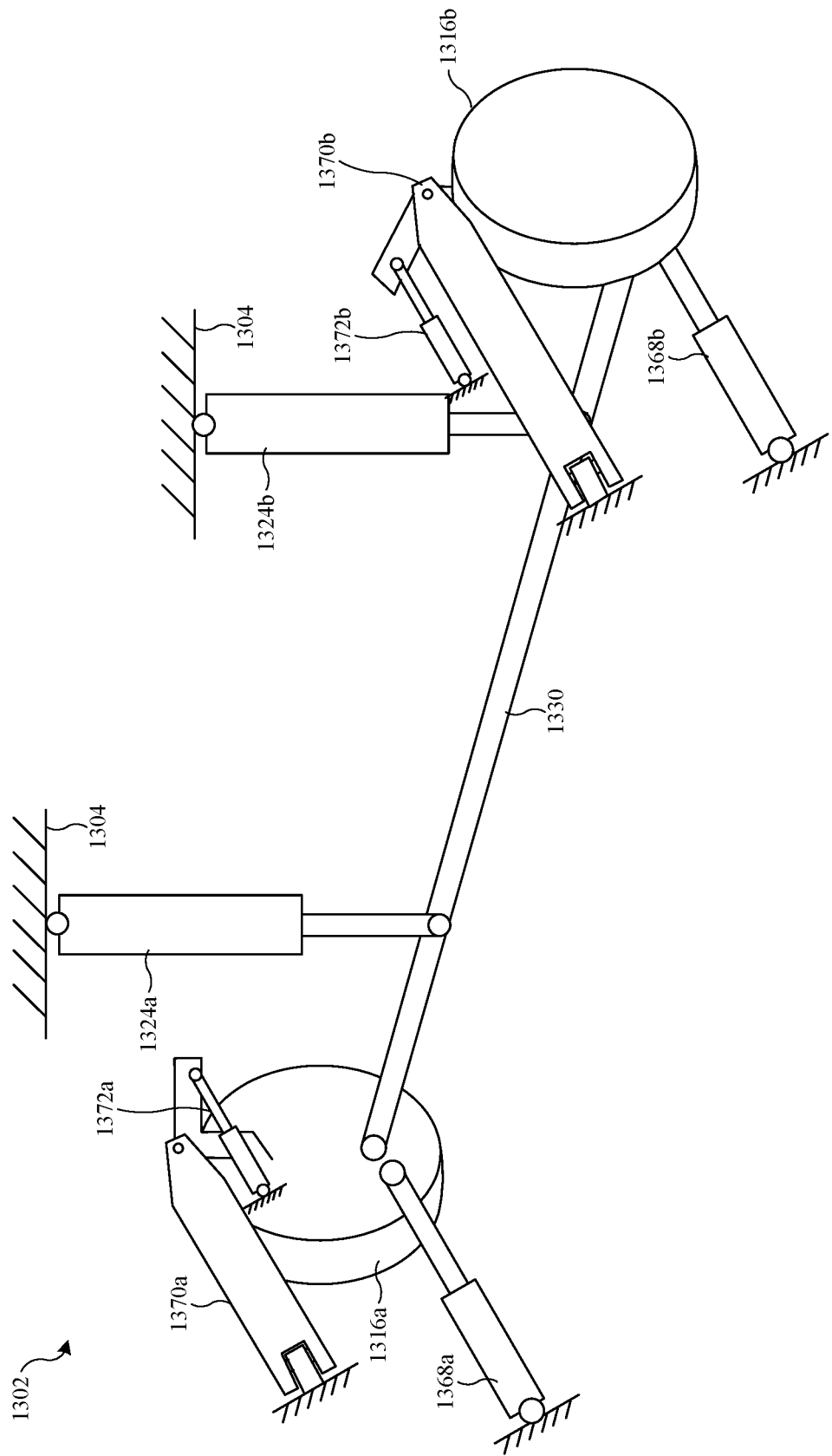
FIG. 13 is a perspective view illustration of a fourth alternative implementation of a suspension system that can be incorporated in the vehicle of FIG. 1.

FIG. 13 is a perspective view illustration of an alternative implementation of a suspension system 1302 that can be incorporated in a vehicle, such as the vehicle 100 of FIG. 1, that has a vehicle body 1304. The suspension system 1302 includes a crossbar 1330 that is connected to a left wheel hub 1316a and a right wheel hub 1316b by joints, such as ball joints, in the manner previously described in connection with the crossbars shown in FIGS. 1-10. The crossbar 1330 may be anchored to the vehicle body 1304 to restrain lateral motion, for example, by a Watt's linkage or a Panhard rod.

A left active suspension actuator 1324a and a right active suspension actuator 1324b are each connected to the crossbar 1330 near the left wheel hub 1316a and the right wheel hub 1316b. Upper ends of the left active suspension actuator 1324a and the right active suspension actuator 1324b are connected to a vehicle body 1304 by rigid, flexible, or pivotable joints. Lower ends of the left active suspension actuator 1324a and the right active suspension actuator 1324b are connected to the crossbar 1330 by rigid, flexible, or pivotable joints. Operation of the left active suspension actuator 1324a and the right active suspension actuator 1324b is otherwise as described with respect to the left active suspension actuator 224a and the right active suspension actuator 224b.

Longitudinal motion of the left wheel hub 1316a is regulated by a left lower longitudinal actuator 1368a and a left upper A-arm 1370a. The left lower longitudinal actuator 1368a may be an actively controlled actuator that is connected to a lower part of the left wheel hub 1316a and is configured to extend and retract to regulate longitudinal movement of the left wheel hub 1316a. The left upper A-arm 1370a is connected an upper part of the left wheel hub 1316a by a pivoting connection, for example, on a knuckle that extends upward from a body of the left wheel hub 1316a, and is also connected to the vehicle body 1304 by a pivoting connection. Thus, the left upper A-arm 1370a may be a two degree of freedom link.

Longitudinal motion of the right wheel hub 1316b is regulated by a right lower longitudinal actuator 1368b and a right upper A-arm 1370b which are identical to the left lower longitudinal actuator 1368a and left upper A-arm 1370a, as previously described.

A left steering actuator 1372a is connected to the left wheel hub 1316a, for example, at a knuckle at an upper part of the left wheel hub 1316a. A right steering actuator 1372b is connected to the right wheel hub 1316b, for example, at a knuckle at an upper part of the right wheel hub 1316b.

Figure 14:
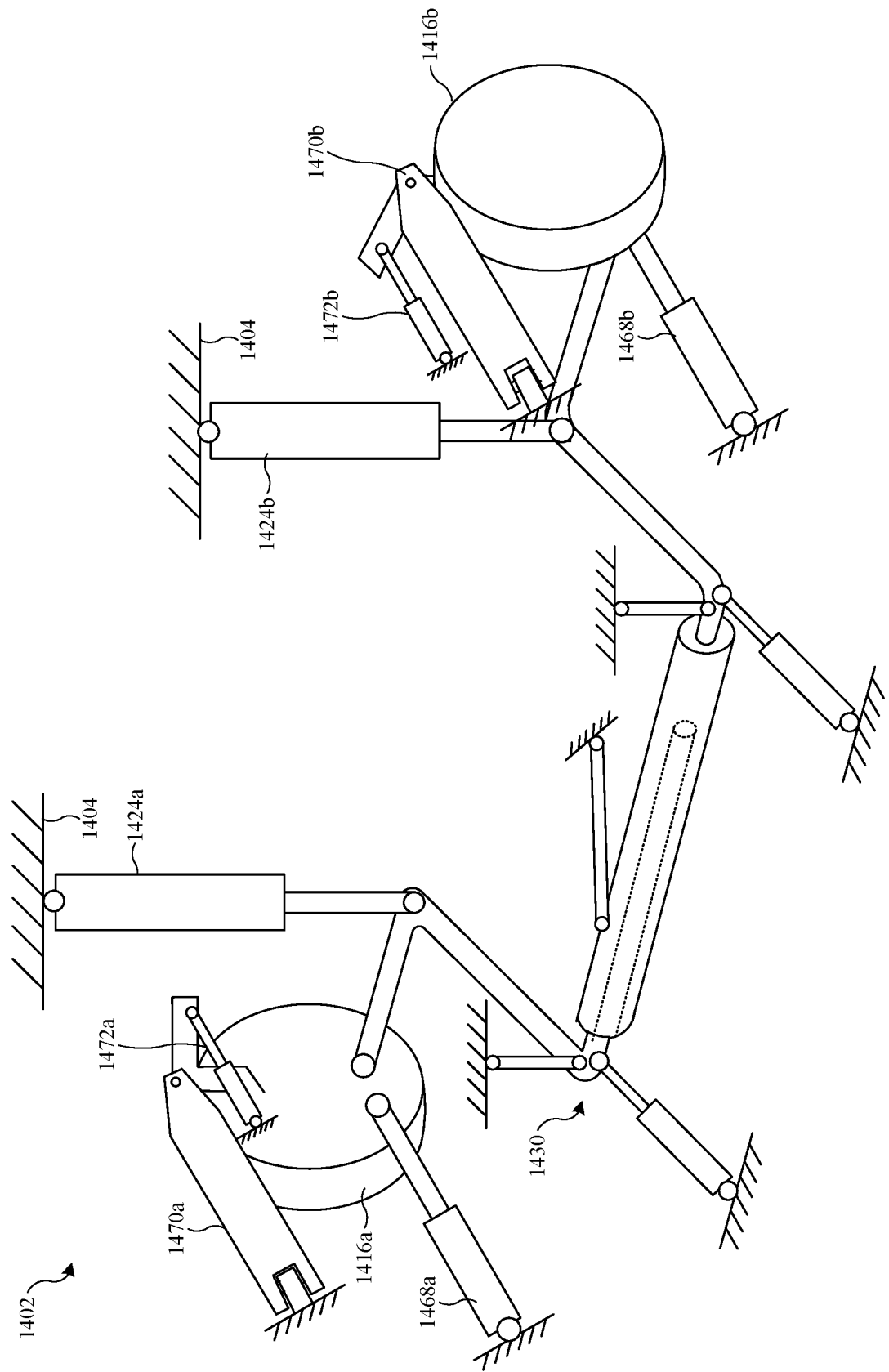
FIG. 14 is a perspective view illustration of a fifth alternative implementation of a suspension system that can be incorporated in the vehicle of FIG. 1.

FIG. 14 is a perspective view illustration of an alternative implementation of a suspension system 1402 that can be incorporated in a vehicle, such as the vehicle 100 of FIG. 1, that has a vehicle body 1404. The suspension system 1402 includes a crossbar 1430 that is connected to a left wheel hub 1416a and a right wheel hub 1416b by joints, such as ball joints. The crossbar 1430 is implemented in accordance with the description of the crossbar 1030, inclusive of the various portions, joints, and supporting structures described in connection with the crossbar 1030.

A left active suspension actuator 1424a and a right active suspension actuator 1424b are each connected to the crossbar 1430 near the left wheel hub 1416a and the right wheel hub 1416b. Upper ends of the left active suspension actuator 1424a and the right active suspension actuator 1424b are connected to a vehicle body 1404 by rigid, flexible, or pivotable joints. Lower ends of the left active suspension actuator 1424a and the right active suspension actuator 1424b are connected to the crossbar 1430 by rigid, flexible, or pivotable joints. Operation of the left active suspension actuator 1424a and the right active suspension actuator 1424b is otherwise as described with respect to the left active suspension actuator 224a and the right active suspension actuator 224b.

Longitudinal motion of the left wheel hub 1416a is regulated by a left lower longitudinal actuator 1468a and a left upper A-arm 1470a. The left lower longitudinal actuator 1468a may be an actively controlled actuator that is connected to a lower part of the left wheel hub 1416a and is configured to extend and retract to regulate longitudinal movement of the left wheel hub 1416a. The left upper A-arm 1470a is connected an upper part of the left wheel hub 1416a by a pivoting connection, for example, on a knuckle that extends upward from a body of the left wheel hub 1416a, and is also connected to the vehicle body 1404 by a pivoting connection. Thus, the left upper A-arm 1470a may be a two degree of freedom link.

Longitudinal motion of the right wheel hub 1416b is regulated by a right lower longitudinal actuator 1468b and a right upper A-arm 1470b which are identical to the left lower longitudinal actuator 1468a and left upper A-arm 1470a, as previously described.

A left steering actuator 1472a is connected to the left wheel hub 1416a, for example, at a knuckle at an upper part of the left wheel hub 1416a. A right steering actuator 1472b is connected to the right wheel hub 1416b, for example, at a knuckle at an upper part of the right wheel hub 1416b.

In an alternative implementation the left upper A-arm 1470a and the right upper A-arm 1470b can be replaced with single degree of freedom links, as described with respect to the left upper longitudinal link 1170a and the right upper longitudinal link 1170b.

Figure 15:
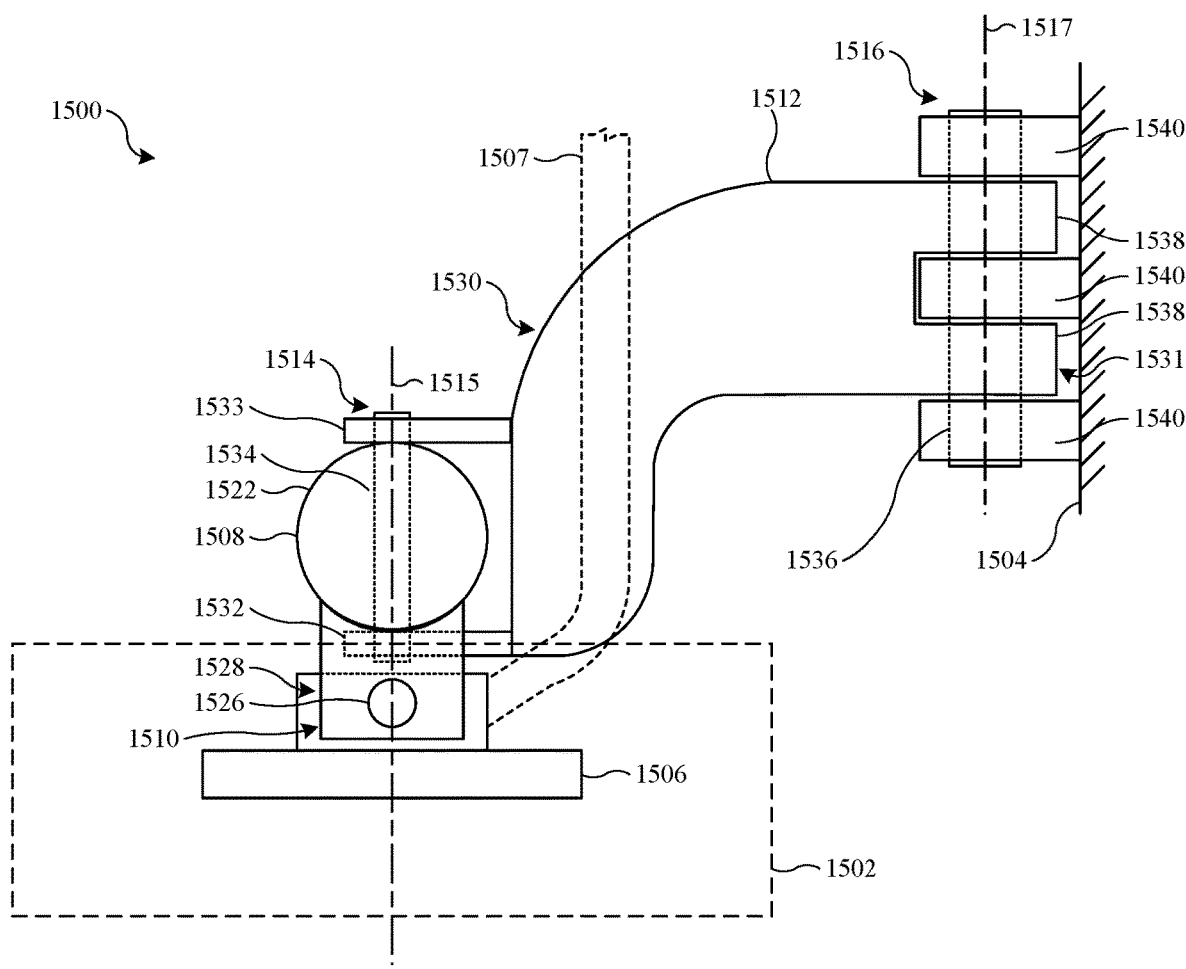
FIG. 15 is a top view illustration that shows a suspension assembly that supports a wheel assembly with respect to a vehicle structure.
Figure 16:
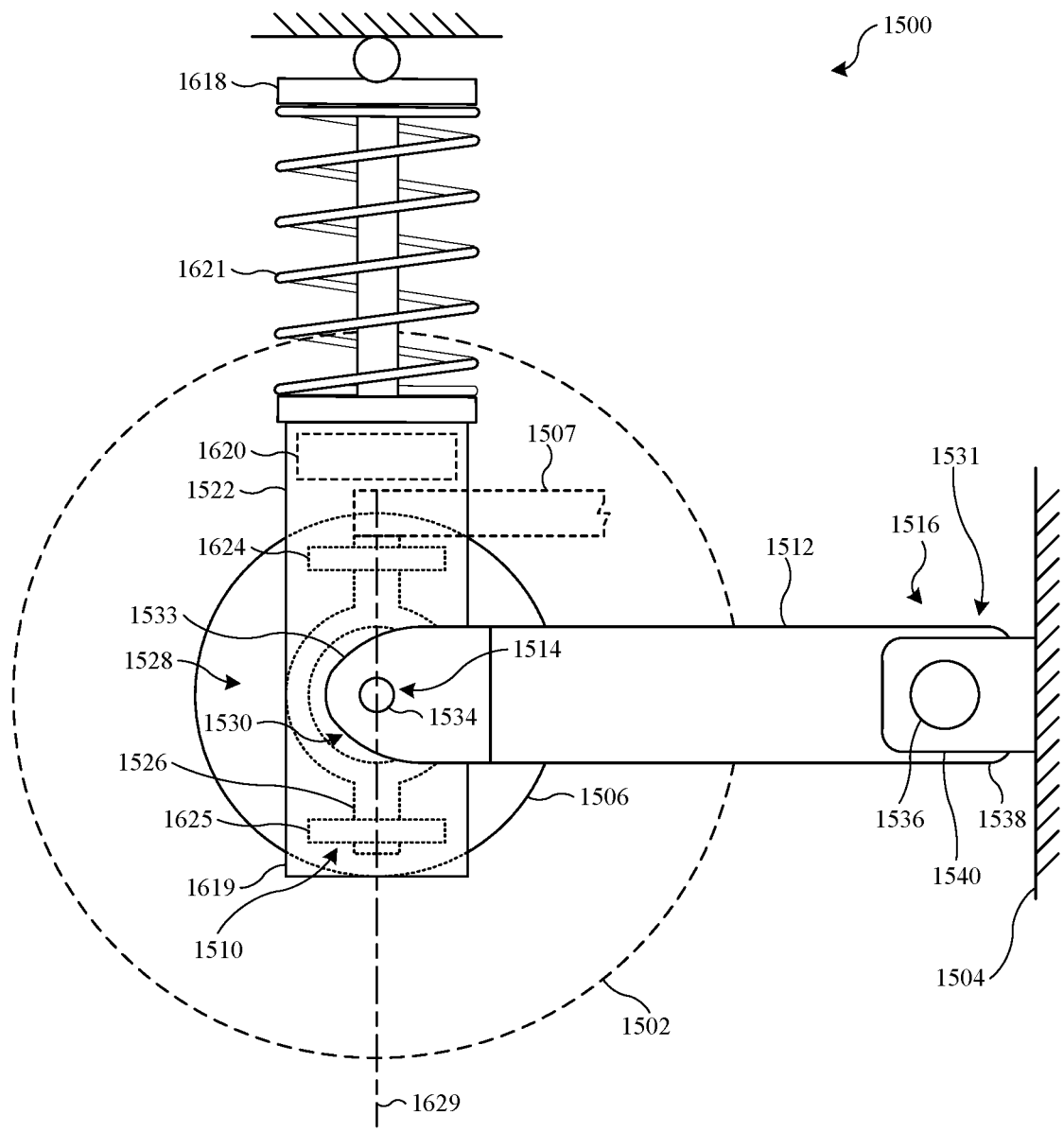
FIG. 16 is side view illustration that shows the suspension assembly of FIG. 15.
Figure 17:
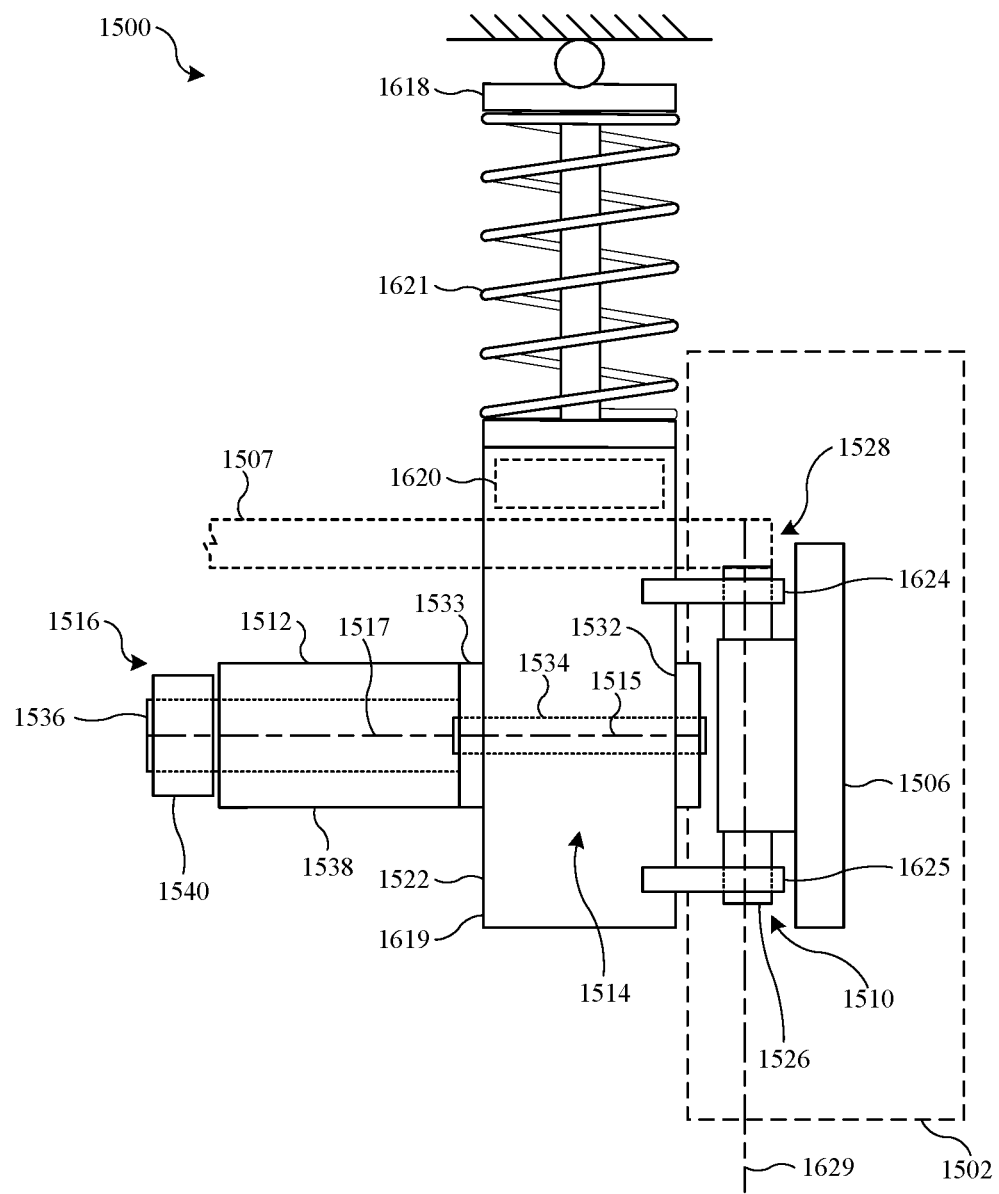
FIG. 17 is a front view illustration that shows the suspension assembly of FIG. 15.

FIG. 15 is a top view illustration that shows a suspension assembly 1500 that supports a wheel assembly 1502 with respect to a vehicle structure 1504. FIG. 16 is side view illustration that shows the suspension assembly 1500. FIG. 17 is a front view illustration that shows the suspension assembly 1500. The suspension assembly 1500 is part of a vehicle, such as the vehicle 100 of FIG. 1. The description of the vehicle 100 is generally applicable to the suspension assembly 1500 and is incorporated in this description by reference.

The suspension assembly 1500 includes a laterally extending suspension arm that defines a leading-arm or trailing-arm type configuration. The wheel assembly 1502 may include a wheel and a tire (e.g., a pneumatic tire) that is mounted to the wheel). The wheel assembly 1502 is part of an unsprung mass of the vehicle and is supported by an underlying surface, such as a roadway surface.

The vehicle structure 1504 is a portion of the vehicle to which the suspension assembly 1500 is connected to support a sprung mass of the vehicle. As examples, the vehicle structure 1504 may be a frame, a subframe, a crossbar, a unibody, a monocoque, or other type of vehicle structure that may be supported by the suspension assembly to transfer load to the wheel assembly 1502.

The suspension assembly 1500 includes a wheel hub 1506, a suspension actuator 1508, a wheel mount 1510, and a suspension arm 1512. A first pivot joint 1514 connects the suspension arm 1512 to the suspension actuator 1508. A second pivot joint 1516 connects the suspension arm 1512 to the vehicle structure 1504.

The wheel hub 1506 is connected to the wheel assembly 1502. The wheel hub 1506 supports the wheel assembly so that the wheel assembly 1502 may rotate on a rotation axis during movement of the vehicle. As will be discussed further herein, the wheel hub 1506 is supported by components of the suspension assembly 1500 so that the wheel assembly 1502 may move upwards and downwards during movement of the vehicle to dampen vertical motion of the vehicle and to absorb vibrations. The wheel hub 1506 may also be supported for pivoting around a substantially vertical axis (e.g., within ten degrees of vertical) to allow steering. The wheel hub 1506 may use a conventional design, for example, including a non-rotating part and a rotating part that are connected to one another by a wheel bearing.

The suspension actuator 1508 is configured to control vertical motion of the wheel assembly. The suspension actuator 1508 extends from an upper end 1618 to a lower end 1619 in a substantially vertical direction (e.g., within ten degrees of vertical), which may include slight inclination relative to vertical in the lateral and/or longitudinal directions of the vehicle. The upper end 1618 of the suspension actuator 1508 is connected to the vehicle structure 1504 (e.g., by a ball joint or other joint). The lower end 1619 of the suspension actuator 1508 is connected to the wheel hub 1506 and to the suspension arm 1512 as will be explained herein.

The suspension actuator 1508 may include passive and/or active components. In the illustrated example, the suspension actuator 1508 includes an active suspension component 1620 and a passive suspension component 1621 that are arranged in series with respect to one another in a single actuator that performs both active and passive suspension functions. The suspension actuator 1508 also includes a housing 1522, which in the illustrated example is located at the lower end 1619 of the suspension actuator 1508, with the active suspension component 1620 being located in the housing 1522. The housing 1522 is a structure that defines an enclosed interior, may be a rigid body, and serves as a structural component to which other structures can be attached. In the illustrated example, the housing 1522 is a cylindrical structure. In the illustrated example, the passive suspension component 1621 (depicted in the form of a spring) is located between the housing 1522 and the upper end 1618 of the suspension actuator 1508.

The active suspension component 1620 is configured to apply force in opposition to high frequency vibrations in order to reduce the magnitude of the high frequency vibrations. The active suspension component 1620 is operable to apply forces between the vehicle structure 1504 and the wheel hub 1506. Thus, operation of the active suspension component may cause expansion of the distance between the wheel hub 1506 and the vehicle structure 1504, may resist expansion of the distance between the wheel hub 1506 and the vehicle structure 1504, may cause contraction of the distance between the wheel hub 1506 and the vehicle structure 1504, or may resist contraction of the distance between the wheel hub 1506 and the vehicle structure 1504.

The active suspension component 1620 is controlled based one motion of the vehicle and/or motion of parts of the vehicle. As an example, the active suspension component 1620 may be controlled based on sensor signals that represent measured vibrations. The active suspension component 1620 can be controlled to dampen accelerations of the vehicle structure 1504 relative to the wheel assembly 1502.

The active suspension component 1620 can be implemented any manner of controllable actuator, such as a controllable mechanical actuator, a controllable electromechanical actuator, a controllable pneumatic actuator and/or a controllable hydraulic actuator. As one example, the active suspension component 1620 may be a linear actuator. As another example, the active suspension component 1620 may be a hydraulic piston-cylinder actuator. As another example, active suspension component 1620 may be a pneumatic piston-cylinder actuator. As another example, active suspension component 1620 may be a pneumatic air spring. As another example, the active suspension component 1620 may be an electromagnetic linear actuator. As another example, the active suspension component 1620 may be a ball screw linear actuator that is driven by an electric motor. Other types of actuators may be used as the active suspension component 1620 to implement active suspension control.

The passive suspension component 1621 of the suspension actuator 1508 is configured to support the vehicle structure 1504, to regulate motion of the vehicle structure 1504 relative to the wheel assembly 1502 and to dampen low-frequency vibrations and motions of the vehicle structure 1504 relative to the wheel assembly 1502. As examples, the passive suspension component 1621 may include springs, air springs (which may be low-frequency active components), shock absorbers, struts, dampers, bushings, and/or other types of passive components.

The wheel mount 1510 is connected to the suspension actuator 1508. The wheel mount 1510 is a structure that is configured to connect the suspension actuator 1508 to the wheel hub 1506. The wheel mount 1510 may be rigidly connected to the suspension actuator 1508, without intervening structures that allow relative motion of the wheel mount 1510 and a portion of the suspension actuator 1508 to which the wheel mount 1510 is connected. For example, the wheel mount 1510 may be connected to the suspension actuator without an intervening pivot joint or ball joint. In the illustrated example, the wheel mount 1510 includes structure that are directly connected to the housing 1522 of the suspension actuator 1508, as will be explained.

The wheel mount 1510 may include an upper mounting structure 1624 that is connected to the housing 1522 of the suspension actuator 1508 and a lower mounting structure 1625 that is connected to the housing 1522 of the suspension actuator 1508. As an example, the upper mounting structure 1624 and the lower mounting structure 1625 may be rigid structures that extend outward from the housing 1522 in order to define connection points at which the wheel hub 1506 can be connected to the suspension actuator 1508. For example, the upper mounting structure 1624 and the lower mounting structure 1625 may extend outward from the housing 1522 of the suspension actuator 1508 in a substantially horizontal direction (e.g., within ten degrees of horizontal). For example, the upper mounting structure 1624 and the lower mounting structure 1625 may extend outward in a direction that is substantially perpendicular (e.g., within ten degrees of perpendicular) to an axis along which the suspension actuator 1508 extends between the upper end 1618 and the lower end 1619 of the suspension actuator 1508. As another example, the upper mounting structure 1624 and the lower mounting structure 1625 may be plate-like, generally planar members that extend outward from the housing 1522 of the suspension actuator 1508.

The wheel mount 1510 includes a structure that is connected to the wheel hub 1506. In the illustrated example, the wheel mount 1510 includes a kingpin 1526 that extends between the upper mounting structure 1624 and the lower mounting structure. The wheel mount 1510 and the wheel hub 1506 define a steering pivot joint 1528 by which the wheel hub 1506 is pivotable with respect to the suspension actuator 1508 around a steering axis 1629 that is defined by the kingpin 1526. For example, the kingpin 1526 may be supported between the upper mounting structure 1624 and the lower mounting structure 1625 to allow rotation of the wheel hub 1506 and the wheel assembly 1502 to change a steering angle of the wheel assembly 1502.

In one implementation of the steering pivot joint 1528, the kingpin 1526 is fixed to the upper mounting structure 1624 and the lower mounting structure 1625 of the wheel mount 1510, and the wheel hub 1506 is connected to the kingpin 1526 such that the wheel hub 1506 is able to pivot around the kingpin 1526. For example, the kingpin 1526 could extend through a corresponding aperture and/or bearing assembly that is included in the wheel hub 1506. In another implementation of the steering pivot joint 1528, the kingpin 1526 is fixed to the wheel hub 1506 and the kingpin 1526 extends between and is pivotally connected to the upper mounting structure 1624 and the lower mounting structure 1625. The kingpin 1526 may be a single-piece structure or may be a multi-part structure. For example, in implementations in which the kingpin 1526 is fixed to the wheel hub 1506, the kingpin 1526 may include a first portion that extends upward from part of the wheel hub 1506 to a pivoting connection with the upper mounting structure 1624 and a second portion that extends downward from a second part of the wheel hub 1506 to a pivoting connection with the lower mounting structure 1625.

The wheel mount 1510 may be the only load-carrying member by which the wheel assembly 1502 is connected to the vehicle structure 1504. Thus, the suspension assembly 1500 may lack other load-carrying connections to the wheel assembly 1502, such as other suspension components (e.g., springs) and other control arms. Other non-load-carrying structures may, however, be connected to the wheel assembly 1502. Examples of non-load-carrying structures include propulsion linkages and steering linkages.

In the illustrated example, the configuration of the wheel mount 1510 allows the wheel assembly 1502 to be a steered wheel with a controllable steering angle by pivoting the wheel assembly 1502 with respect to the wheel mount 1510. The wheel mount 1510 could instead be configured define a fixed angular relationship for the wheel assembly 1502 if it is not a steered wheel.

The suspension arm 1512 is a rigid structure that is configured to constrain motion of the wheel assembly 1502. The suspension arm 1512 extends in a substantially longitudinal direction (e.g., within ten degrees of a longitudinal direction) that corresponds to the nominal travel direction of the vehicle, such that it is configured as a leading arm or a trailing arm depending on its position relative to the wheel assembly 1502 and the vehicle structure 1504.

The suspension arm 1512 has a first end 1530 and a second end 1531. The first end 1530 of the suspension arm 1512 is connected to the suspension actuator 1508. The second end 1531 of the suspension arm 1512 is connected to the vehicle structure 1504. In the illustrated example, the first pivot joint 1514 is located at the first end 1530 of the suspension arm 1512 and connects the first end 1530 the suspension arm 1512 to the suspension actuator 1508. The second pivot joint 1516 is located at the second end 1531 of the suspension arm 1512 and connects the second end 1531 of the suspension arm 1512 to the vehicle structure 1504.

The first pivot joint 1514 extends along a first pivot axis 1515. The first pivot axis 1515 may extend in a generally lateral direction (e.g., a cross-vehicle direction that is perpendicular to the nominal direction of travel of the vehicle) with respect to the vehicle structure 1504. The second pivot joint 1516 extends along a second pivot axis 1517. The second pivot axis 1517 may also extend in the generally lateral direction with respect to the vehicle structure 1504. Accordingly, the first pivot axis 1515 may be parallel to the second pivot axis 1517.

In the illustrated example, the first pivot joint 1514 of the suspension arm 1512 is defined by an outer mounting structure 1532 and an inner mounting structure 1533 that are located at the first end 1530 of the suspension arm 1512. The outer mounting structure 1532 is located laterally outward from the suspension actuator 1508. The inner mounting structure 1533 is located laterally inward from the suspension actuator 1508. At least part of the housing 1522 of the suspension actuator 1508 is located between the outer mounting structure 1532 and the inner mounting structure 1533.

The first pivot joint 1514 includes a first pivot pin 1534 that connects the suspension arm 1512 to the suspension actuator 1508. The first pivot pin 1534 extends along the first pivot axis 1515, is fixed to one of the suspension arm 1512 or the suspension actuator 1508, and is pivotally connected to the other of the suspension arm 1512 and the suspension actuator 1508. The first pivot pin 1534 may be a single piece structure that, for example, extends from the outer mounting structure 1532 to the inner mounting structure 1533 and extends through the housing 1522 of the suspension actuator 1508. Alternatively, the first pivot pin 1534 may be a two-piece structure that, for example, includes a first part that extends from the outer mounting structure 1532 to a first connection with the housing 1522 of the suspension actuator 1508 and includes a second part that extends from the inner mounting structure 1533 to a second connection with the housing 1522 of the suspension actuator 1508.

The suspension arm 1512 constrains motion of the wheel assembly 1502 along an arc, but given the length of the suspension arm 1512 relative to the range of motion of the wheel assembly 1502, motion of the wheel assembly 1502 is effectively constrained by the suspension arm 1512 to be generally vertical over the range of motion of the wheel assembly 1502. Thus, the suspension arm 1512 is configured to limit movement of the wheel assembly 1502 in directions other than the generally vertical direction. The suspension arm 1512 extends in the longitudinal direction, is inflexible in the longitudinal direction, and therefore limits movement of the wheel assembly 1502 in the longitudinal direction other than small deviations attributable to the arc-shaped generally vertical motion. The suspension arm 1512 may limit lateral motion of the wheel assembly 1502 because of the lateral orientation of the first pivot axis 1515 of the first pivot joint 1514 and because of the lateral orientation of the second pivot axis 1517 of the second pivot joint 1516.

In the illustrated example, the second pivot joint 1516 of the suspension arm 1512 is defined by a mounting portion 1538, a vehicle-side mounting structure 1540, and a second pivot pin 1536. The mounting portion 1538 and the vehicle-side mounting structure 1540 are connected to each other by the second pivot joint 1516. The mounting portion 1538 is located at the second end 1531 of the suspension arm 1512. The vehicle-side mounting structure 1540 is part of the vehicle structure 1504 or is connected to the vehicle structure 1504.

The second pivot joint 1516 may be defined in part by apertures that are formed through the mounting portion 1538 and through the vehicle-side mounting structure 1540 to receive the second pivot pin 1536. The second pivot pin 1536 may be fixed with respect to one of the mounting portion 1538 and the vehicle-side mounting structure 1540 and rotatable with respect to the other of the mounting portion 1538 and the vehicle-side mounting structure 1540, or may be rotatable with respect to both the mounting portion 1538 and the vehicle-side mounting structure 1540.

Each of the mounting portion 1538 and the vehicle-side mounting structure 1540 may include one or more parts that extend outward from the remainder of the suspension arm 1512 and the vehicle structure 1504. Thus, for example, the second pivot joint 1516 may include multiple parts that are connected in an interleaved configuration.

Figure 18:
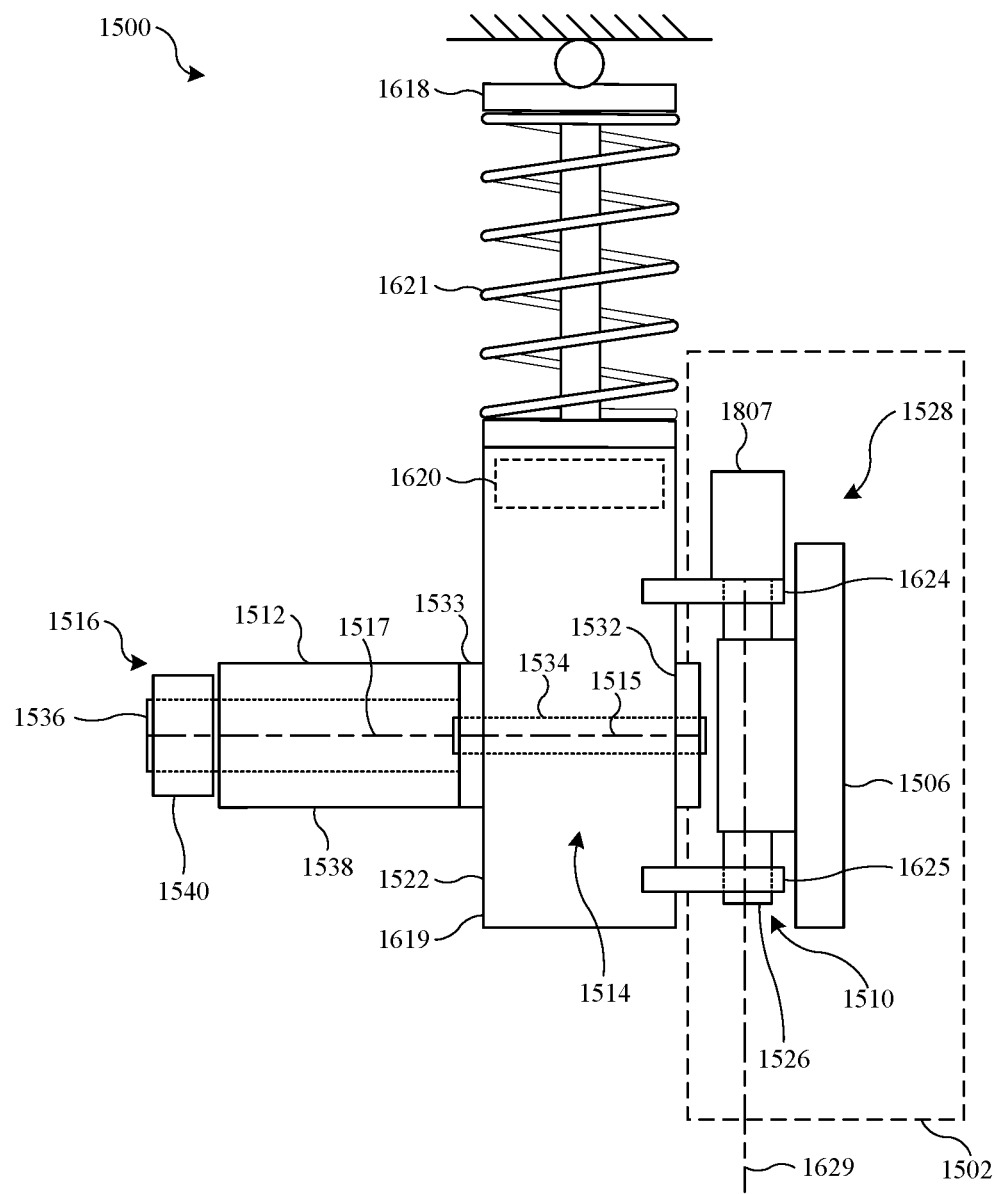
FIG. 18 is a front view illustration that shows the suspension assembly of FIG. 15 and includes a steering actuator.

A steering linkage 1507 may be connected to the wheel hub 1506 for steering control by a steering actuator (not shown) to change the steering angle of the wheel assembly 1502. Alternatively, as shown in FIG. 18, a steering actuator 1807 may be connected to the wheel mount 1510 and to the kingpin 1526 to rotate the kingpin 1526 to thereby rotate the wheel hub 1506 to change the steering angle of the wheel assembly 1502. The implementation shown in FIG. 18 omits the steering linkage 1507 but otherwise includes all of the elements described in connection with the suspension assembly 1500.

Figure 19:
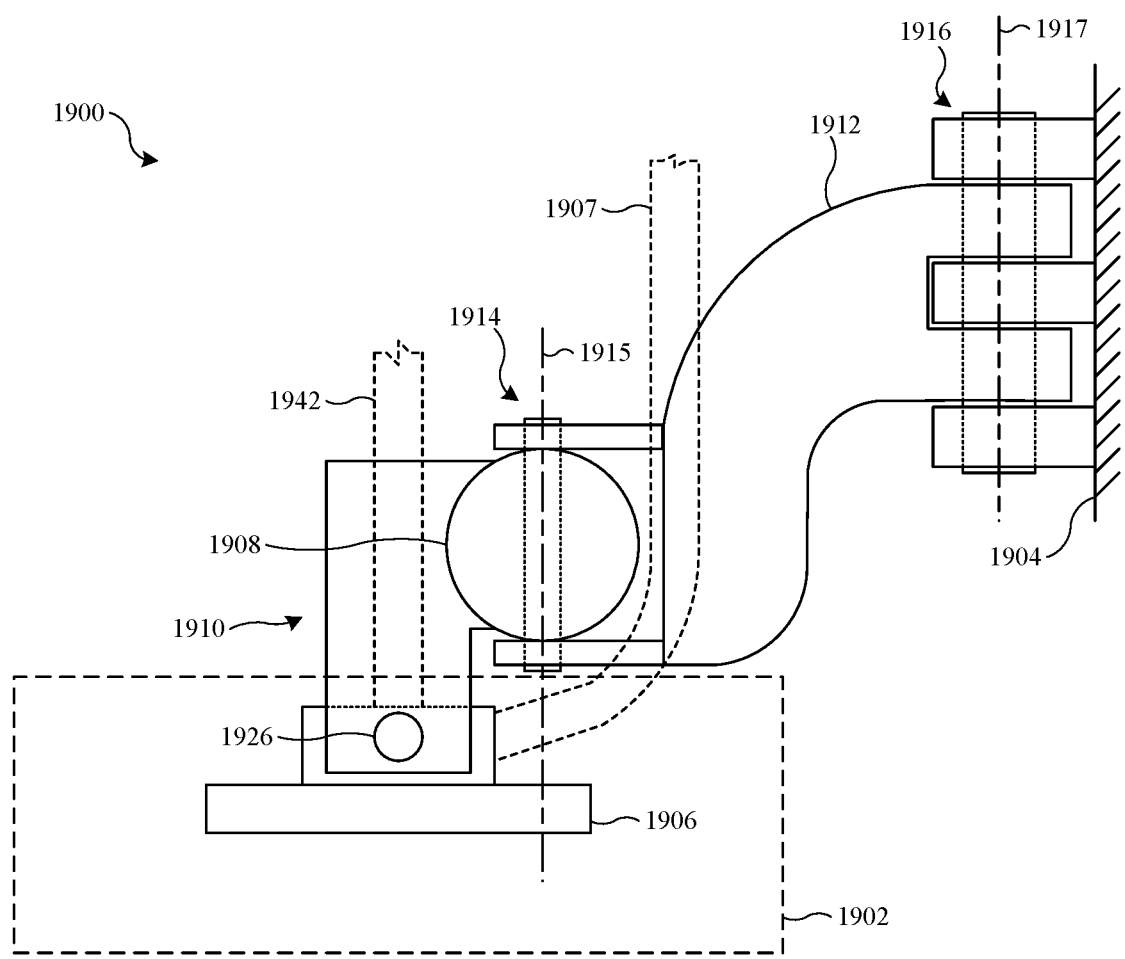
FIG. 19 is a top view illustration that shows a suspension assembly that supports a wheel assembly with respect to a vehicle structure.
Figure 20:
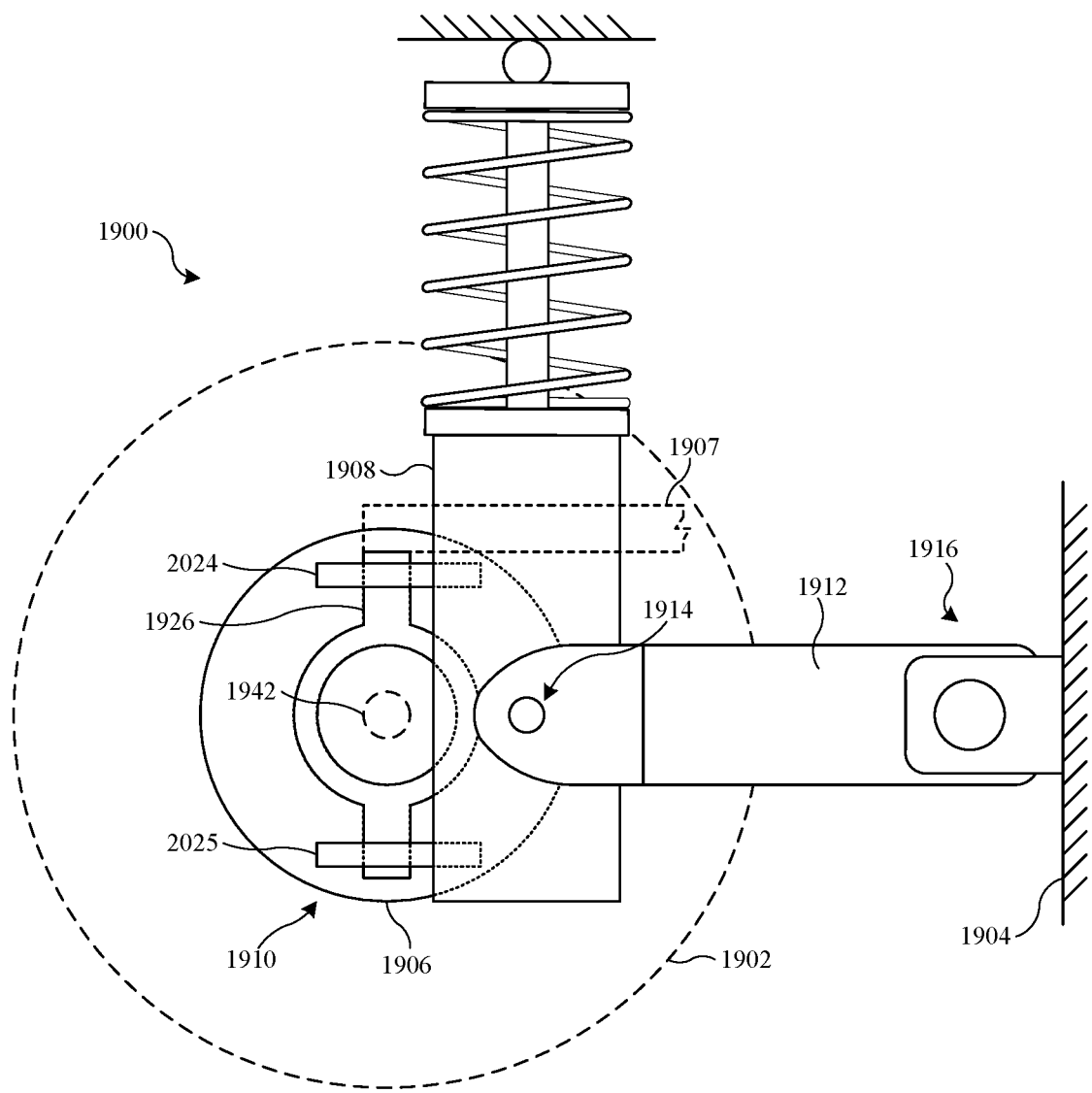
FIG. 20 is side view illustration that shows the suspension assembly of FIG. 19.
Figure 21:
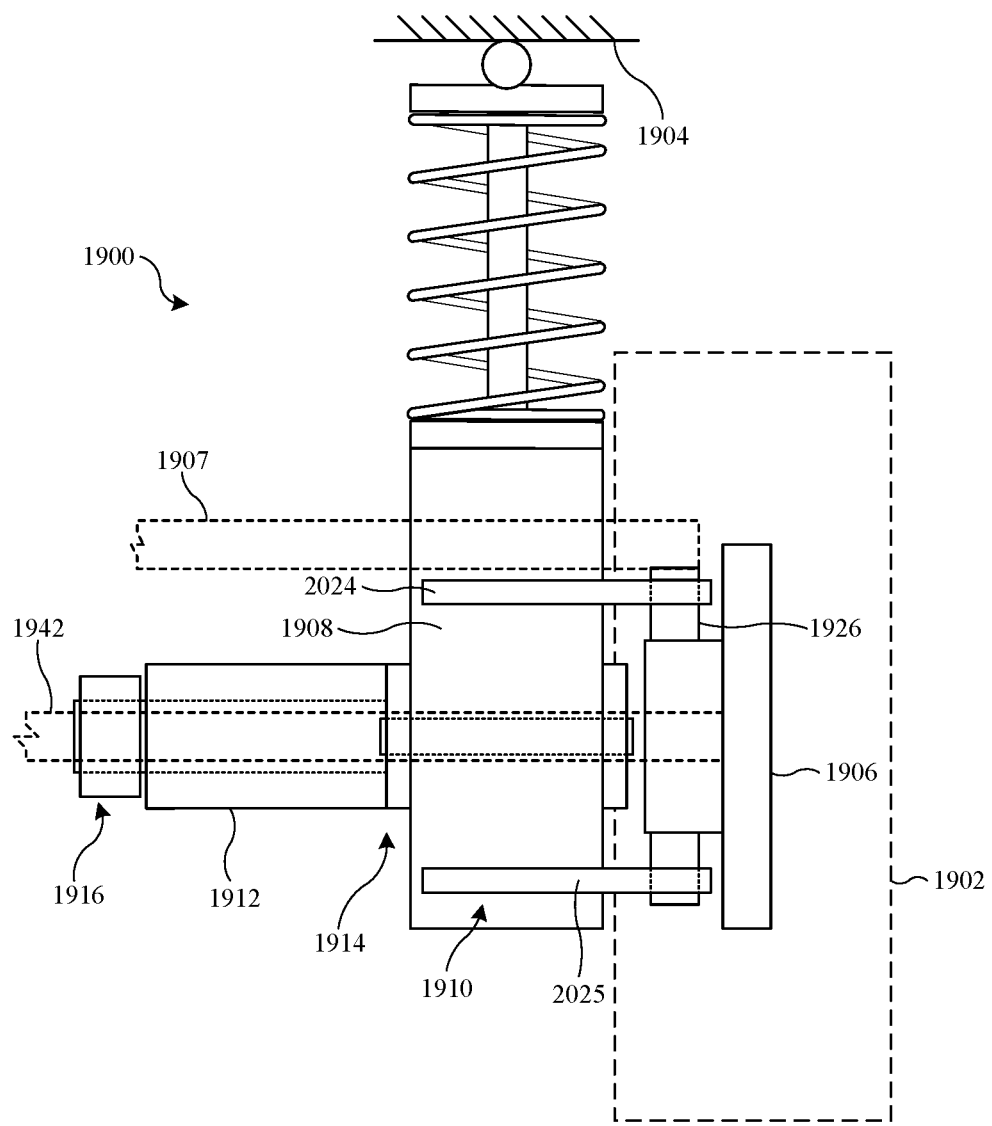
FIG. 21 is a front view illustration that shows the suspension assembly of FIG. 19.

FIG. 19 is a top view illustration that shows a suspension assembly 1900 that supports a wheel assembly 1902 with respect to a vehicle structure 1904. FIG. 20 is side view illustration that shows the suspension assembly 1900. FIG. 21 is a front view illustration that shows the suspension assembly 1900. The suspension assembly 1900 is part of a vehicle, such as the vehicle 100 of FIG. 1. The description of the vehicle 100 is generally applicable to the suspension assembly 1900 and is incorporated in this description by reference. The description of the suspension assembly 1500 is also generally applicable to the suspension assembly 1900 and is incorporated in this description by reference. Parts of the suspension assembly 1900 may be implemented in the manner described with respect to like-named parts of the suspension assembly 1500 except as otherwise described herein.

The suspension assembly 1900 includes a laterally extending suspension arm that defines a leading-arm or trailing-arm type configuration. The wheel assembly 1902 may include a wheel and a tire (e.g., a pneumatic tire) that is mounted to the wheel). The wheel assembly 1902 is part of an unsprung mass of the vehicle and is supported by an underlying surface, such as a roadway surface.

The vehicle structure 1904 is a portion of the vehicle to which the suspension assembly 1900 is connected to support a sprung mass of the vehicle. As examples, the vehicle structure 1904 may be a frame, a subframe, a crossbar, a unibody, a monocoque, or other type of vehicle structure that may be supported by the suspension assembly to transfer load to the wheel assembly 1902.

The suspension assembly 1900 includes a wheel hub 1906, a suspension actuator 1908, a wheel mount 1910, and a suspension arm 1912. A first pivot joint 1914 extends along a first pivot axis 1915 and connects the suspension arm 1912 to the suspension actuator 1908. A second pivot joint 1916 extends along a second pivot axis 1917 and connects the suspension arm 1912 to the vehicle structure 1904.

In the suspension assembly 1500, the suspension actuator 1508 is positioned laterally adjacent to the wheel hub 1506, and a rotation axis of the wheel assembly 1502 extends through the suspension actuator 1508. The wheel mount 1510 extends laterally outward from the suspension actuator 1508 to the wheel hub 1506. This configuration is well-suited to use with non-driven wheels and with wheels that are driven by hub motors.

In the suspension assembly 1900, a propulsion shaft 1942 may be connected to the wheel hub 1906 to cause rotation of the wheel assembly 1902 when driven by a motor (not shown). The suspension actuator 1908 is located longitudinally between the propulsion shaft 1942 and the vehicle structure 1904. Thus, the suspension actuator 1908 is longitudinally offset from (e.g., forward or rearward from) the rotation axis of the wheel hub 1906 and the propulsion shaft 1942.

The wheel mount 1910 extends longitudinally (e.g., forward or rearward) from the suspension actuator 1908 toward the propulsion shaft 1942 and extends laterally outward toward the wheel hub 1906 where the wheel mount 1910 is connected to the wheel hub 1906. For example, the wheel mount 1910 may include an upper mounting structure 2024 and a lower mounting structure 2025. The wheel mount 1910 may include a kingpin 1926 that extends between the upper mounting structure 2024 and the lower mounting structure 2025 to connect the wheel mount 1910 to the wheel hub 1906 (e.g., in a manner that allows rotation for steering).

The upper mounting structure 2024 is connected to the suspension actuator 1908 and to the wheel hub 1906. The upper mounting structure 2024 extends from the suspension actuator 1908 to the wheel hub 1906 to transfer forces between the suspension actuator 1908 and the wheel hub 1906. The upper mounting structure 2024 is located above the propulsion shaft 1942 in the area laterally adjacent to the wheel hub 1906.

The lower mounting structure 2025 is connected to the suspension actuator 1908 and to the wheel hub 1906. The lower mounting structure 2025 extends from the suspension actuator 1908 to the wheel hub 1906 to transfer forces between the suspension actuator 1908 and the wheel hub 1906. The lower mounting structure 2025 is located below the propulsion shaft 1942 in the area laterally adjacent to the wheel hub 1906.

The wheel assembly 1902 may be steered using a steering linkage 1907 or may be steered using a steering actuator that is connected to the wheel mount 1910 as described with respect to the steering actuator 1807 of FIG. 18.

Figure 22:
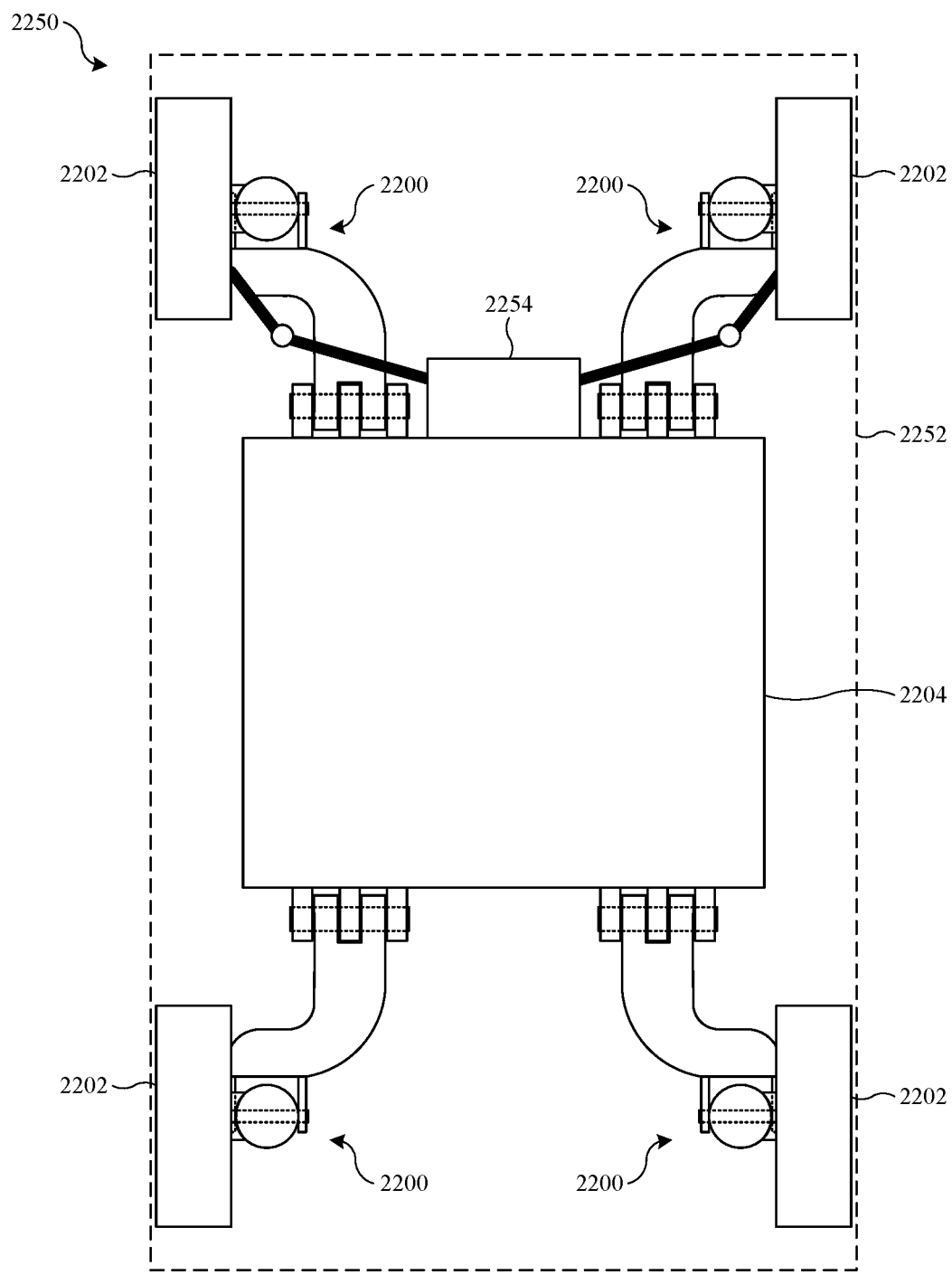
FIG. 22 is top view illustration that shows a vehicle.

FIG. 22 is top view illustration that shows a vehicle 2250. The vehicle 2250 includes four suspension assemblies 2200, four wheel assemblies 2202, a vehicle structure 2204, a vehicle body 2252 that is supported by the vehicle structure 2204, a steering system 2254. The suspension assemblies 2200 may be implemented in the manner described with respect to the suspension assembly 1500 and/or the suspension assembly 1900. The descriptions of the suspension assembly 1500 and the suspension assembly 1900 are applicable to the vehicle 2250 and the suspension assemblies 2200, and are incorporated in this description by reference. The suspension assemblies 2200 are connected to the vehicle structure 2204 as previously described with respect to the suspension assembly 1500 and the suspension assembly 1900.

Figure 23:
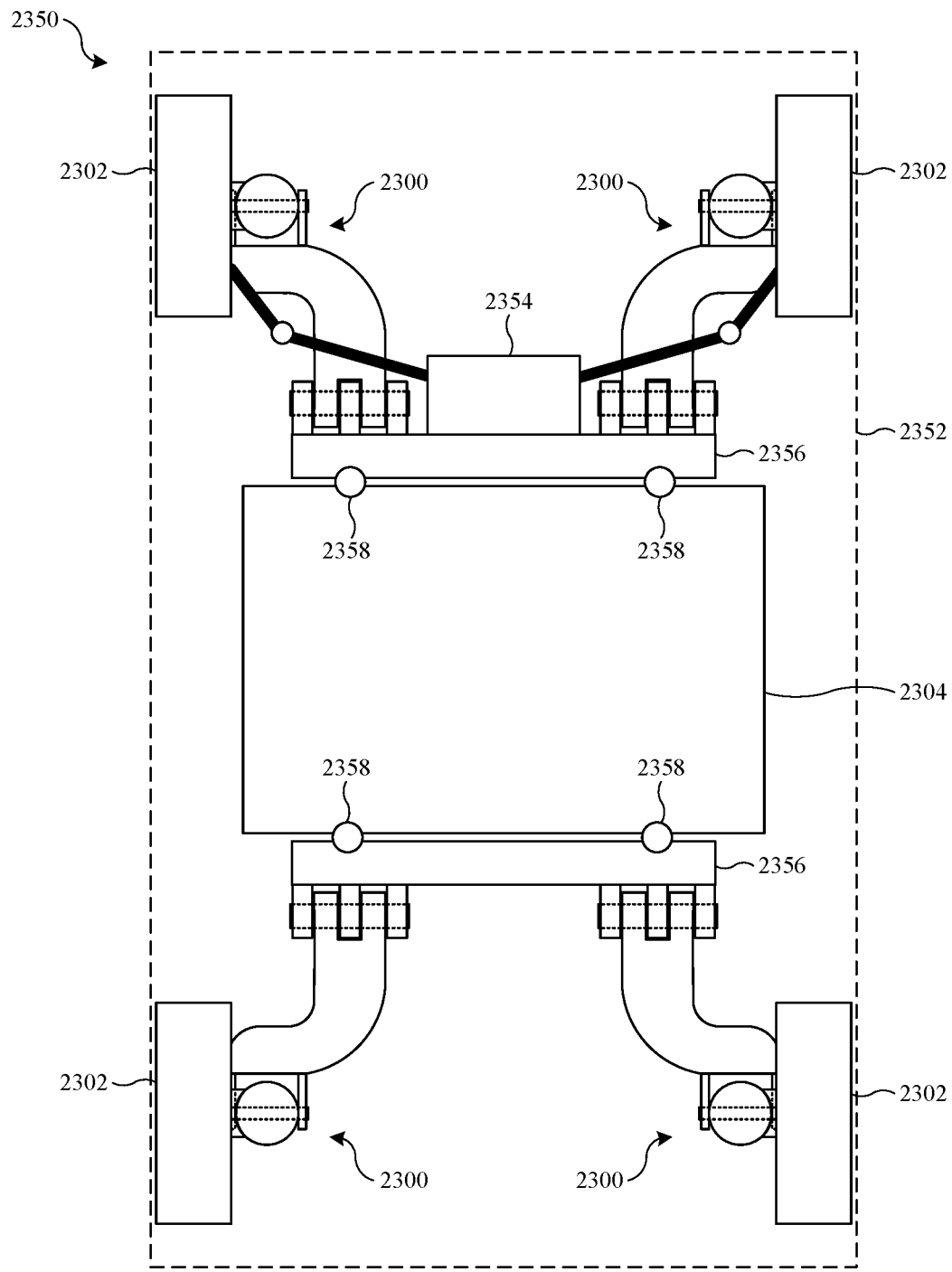
FIG. 23 is top view illustration that shows a vehicle.

FIG. 23 is top view illustration that shows a vehicle 2350. The vehicle 2350 includes four suspension assemblies 2300, four wheel assemblies 2302, a vehicle structure 2304, a vehicle body 2352 that is supported by the vehicle structure 2304, a steering system 2354, and crossbars 2356 at front and rear longitudinal ends of the vehicle structure 2304. The suspension assemblies 2300 may be implemented in the manner described with respect to the suspension assembly 1500 and/or the suspension assembly 1900. The descriptions of the suspension assembly 1500 and the suspension assembly 1900 are applicable to the vehicle 2350 and the suspension assemblies 2300, and are incorporated in this description by reference.

The suspension assemblies 2300 are not directly connected to the vehicle structure 2304 as previously described with respect to the suspension assembly 1500 and the suspension assembly 1900. Instead, the suspension assemblies 2300 are connected to the crossbars 2356, which are connected (e.g., directly) to the vehicle structure 2304. The suspension assemblies 2300 are connected to crossbars 2356 by pivot joints in the manner described with respect to the second pivot joints 1516, 1916 that connect the suspension arms 1512, 1912 to the vehicle structures 1504, 1904 in the suspension assembly 1500 and the suspension assembly 1900.

The crossbars 2356 are connected to the vehicle structure 2304 by joints 2358. In one implementation, the joints 2358 rigidly connect the crossbars 2356 to the vehicle structure 2304. In other implementations, the crossbars 2356 are able to move with respect to the vehicle structure 2304 over a limited range of motion in one or more linear and/or rotational degrees of freedom. In one implementation, the joints 2358 are compliant bushings. In another implementation, the joints 2358 are pivot joints. In another implementation, the joints 2358 are ball joints. In another implementation, the joints 2358 include sliding mounts and linear springs or dampers that regulate linear motion (e.g., in the longitudinal direction) of the crossbars 2356 with respect to the vehicle structure 2304. The crossbars 2356 may be connected to the vehicle structure 2304 by the joints 2358 such that the joints 2358 constrain motion of the crossbars 2356 such that the crossbars 2356 are only able to move with respect to the vehicle structure in a generally longitudinal direction.

As described above, one aspect of the present technology is the gathering and use of data available from various sources to control operation of an active suspension system and thereby improve the ride quality of a vehicle. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information. As one example, information describing a user of the vehicle may be collected and used to adjust the ride of the vehicle based on user preferences. As another example, the vehicle may include sensors that are used to control operation of the vehicle, and these sensors may obtain information (e.g., still pictures or video images) that can be used to identify persons present in the image.

The present disclosure recognizes that the use of such personal information data, in the present technology, can be used to the benefit of users. For example, the personal information data can be used to develop a user profile that describes user comfort levels for certain types of motion of the vehicle.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the identifying content to be displayed to users, the present technology can be configured to allow users to select to "opt in" or "opt out" of participation in the collection of personal information data during registration for services or anytime thereafter. In another example, users can select not to provide personal data for use in suspension control. In yet another example, users can select to limit the length of time personal data is maintained or entirely prohibit the use and storage of personal data. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, customized suspension control can be performed using non-personal information data or a bare minimum amount of personal information, other non-personal information available to the devices, or publicly available information.

What is claimed is:

1. A vehicle suspension system, comprising:
   a crossbar that extends between a first wheel assembly and a second wheel assembly of the vehicle, the crossbar including a first crossbar portion connected to the first wheel assembly, a second crossbar portion connected to the second wheel assembly, and a connecting structure that connects the first crossbar portion to the second crossbar portion in a manner that allows relative lateral motion of the first crossbar portion and the second crossbar portion;
   a first suspension component that is connected to a vehicle body near the first wheel assembly and the first suspension component is coupled to the first crossbar portion of the crossbar; and
   a second suspension component that is connected to the vehicle body near the second wheel assembly and the second suspension component is coupled to the second crossbar portion of the crossbar,
   wherein the first suspension component and the second suspension component are controllable to apply a force to the crossbar to dampen accelerations of the vehicle body relative to the first wheel assembly and the second wheel assembly.

2. The vehicle suspension system of claim 1, wherein the connecting structure includes a telescopic joint that connects the first crossbar portion to the second crossbar portion.

3. The vehicle suspension system of claim 1, wherein the connecting structure includes a lateral decoupling linkage that connects the first crossbar portion to the second crossbar portion.

4. The vehicle suspension system of claim 1, wherein the first wheel assembly includes a first wheel hub, the second wheel assembly includes a second wheel hub, the crossbar is pivotally connected to the first wheel hub of the first wheel assembly, and the crossbar is pivotally connected to the second wheel hub of the second wheel assembly.

5. The vehicle suspension system of claim 4, further comprising:
   a first ball joint that pivotally connects the crossbar to the first wheel hub; and
   a second ball joint that pivotally connects the crossbar to the second wheel hub.

6. The vehicle suspension system of claim 1, wherein the first suspension component and the second suspension component are each mounted in a substantially vertical orientation.

7. The vehicle suspension system of claim 1, wherein the first suspension component and the second suspension component are linear actuators.

8. A vehicle suspension system, comprising:
   a first lower control arm connected to a first wheel assembly of the vehicle;
   a second lower control arm connected to a second wheel assembly of the vehicle;
   a connecting bar that includes a first portion configured to be connected to a first wheel hub of the first wheel assembly and a second portion that is configured to be connected to a second wheel hub of the second wheel assembly, wherein the first portion is located adjacent to the first lower control arm and the second portion is configured to be located adjacent to the second lower control arm;
   a first active suspension actuator that is configured to be connected to a vehicle body and connected to the first portion of the connecting bar;
   a second active suspension actuator that is configured to be connected to the vehicle body and connected to the second portion of the connecting bar; and
   a telescopic joint that connects the first portion and the second portion of the connecting bar and allows lateral motion of the first portion of the connecting bar with respect to the second portion of the connecting bar.

9. The vehicle suspension system of claim 8, wherein the telescopic joint connects the first portion and the second portion of the connecting bar to allow a lateral distance between the first wheel assembly and the second wheel assembly to vary based on insertion and retraction of the telescopic joint.

10. The vehicle suspension system of claim 8, wherein the first active suspension actuator and the second active suspension actuator are each mounted in a substantially vertical orientation.

11. The vehicle suspension system of claim 8, wherein the first active suspension actuator and the second active suspension actuator are linear actuators.

12. The vehicle suspension system of claim 8, wherein the connecting bar is pivotally connected to the first wheel hub of the first wheel assembly and the connecting bar is pivotally connected to the second wheel hub of the second wheel assembly.

13. The vehicle suspension system of claim 12, further comprising:
- a first ball joint that pivotally connects the connecting bar to the first wheel hub; and
- a second ball joint that pivotally connects the connecting bar to the second wheel hub.

14. A vehicle suspension system, comprising:
- a connecting structure that is configured to be connected to a first wheel assembly of the vehicle and a second wheel assembly of the vehicle, wherein the connecting structure includes a first portion connected to the first wheel assembly and a second portion connected to the second wheel assembly, that are connected to each other by a first link and a second link that define a four-bar linkage arrangement that allows relative lateral motion of the first portion and the second portion, wherein the first link and the second link are spaced apart from the first wheel assembly and the second wheel assembly;
- a first active suspension component that is connected between a vehicle body and the connecting structure; and
- a second active suspension component that is connected between the vehicle body and the connecting structure.

15. The vehicle suspension system of claim 14, wherein the connecting structure is pivotally connected to a first wheel hub of the first wheel assembly by a first ball joint and the connecting structure is pivotally connected to a second wheel hub of the second wheel assembly by a second ball joint.

16. The vehicle suspension system of claim 14, further comprising:
- a first passive suspension component connected in parallel with the first active suspension component; and
- a second passive suspension component connected in parallel with the second active suspension component.

17. The vehicle suspension system of claim 14, wherein the first active suspension component and the second active suspension component are each mounted in a substantially vertical orientation.

18. The vehicle suspension system of claim 14, wherein the first active suspension component and the second active suspension component are linear actuators.

19. The vehicle suspension system of claim 14, wherein the first link has a first end pivotally connected to the first portion and a second end pivotally connected to the second portion.

20. The vehicle suspension system of claim 19, wherein the second link has a first end pivotally connected to the first portion and a second end pivotally connected to the second portion and the second link is substantially parallel to the first link.

21. The vehicle suspension system of claim 1, wherein the first suspension component is controllable to apply a first vertical force to the first crossbar portion to allow the first vertical force to be transmitted from the first crossbar portion to the second crossbar portion through the connecting structure, and wherein the second suspension component is controllable to apply a second vertical force to the second crossbar portion to allow the second vertical force to be transmitted from the second crossbar portion to the first crossbar portion.

22. The vehicle suspension system of claim 8, wherein the first active suspension actuator is operable to apply a first vertical force to the first portion of the connecting bar and the second active suspension actuator is operable to apply a second vertical force to the second portion of the connecting bar.

\* \* \* \* \*